(12) United States Patent
Sibley et al.

(10) Patent No.: US 11,751,558 B2
(45) Date of Patent: *Sep. 12, 2023

(54) AUTONOMOUS AGRICULTURAL TREATMENT SYSTEM USING MAP BASED TARGETING OF AGRICULTURAL OBJECTS

(71) Applicant: Verdant Robotics, Inc., Hayward, CA (US)

(72) Inventors: Gabriel Thurston Sibley, Portland, OR (US); Lorenzo Ibarria, Dublin, CA (US); Curtis Dale Garner, Modesto, CA (US); Patrick Christopher Leger, Belmont, CA (US); Andre Robert Daniel Michelin, Topanga, CA (US); John Phillip Hurliman, II, Oakland, CA (US); Wisit Jirattigalochote, Palo Alto, CA (US); Hasan Tafish, Foster City, CA (US)

(73) Assignee: Verdant Robotics, Inc., Hayward, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/392,202

(22) Filed: Aug. 2, 2021

(65) Prior Publication Data

US 2022/0117213 A1    Apr. 21, 2022

Related U.S. Application Data

(63) Continuation of application No. 17/073,236, filed on Oct. 16, 2020, now Pat. No. 11,076,589.

(51) Int. Cl.
*G06V 20/10* (2022.01)
*A01M 7/00* (2006.01)
(Continued)

(52) U.S. Cl.
CPC ......... *A01M 7/0089* (2013.01); *A01C 21/007* (2013.01); *A01C 23/008* (2013.01);
(Continued)

(58) Field of Classification Search
CPC ... A01C 21/007; A01C 23/007; A01C 23/008; A01C 23/023; A01C 23/047; A01G 7/06;
(Continued)

(56) References Cited

U.S. PATENT DOCUMENTS 10,823,591 B2    11/2020  Yang
10,891,482 B2 *   1/2021  Gurzoni, Jr. ......... G06V 10/803
(Continued)

FOREIGN PATENT DOCUMENTS

CN    112036265 A    12/2020

OTHER PUBLICATIONS

Notice of Allowance in U.S. Appl. No. 17/073,236, dated Mar. 24, 2021.
(Continued)

*Primary Examiner* — Ian L Lemieux
(74) *Attorney, Agent, or Firm* — Cognition IP, P.C.; Edward Steakley

(57) ABSTRACT

Various embodiments of an apparatus, methods, systems and computer program products described herein are directed to an agricultural observation and treatment system and method of operation. The agricultural treatment system may determine a first real-world geo-spatial location of the treatment system. The system can receive captured images depicting real-world agricultural objects of a geographic scene. The system can associate captured images with the determined geo-spatial location of the treatment system. The treatment system can identify, from a group of mapped and indexed images, images having a second real-word geo-spatial location that is proximate with the first real-world
(Continued)

geo-spatial location. The treatment system can compare at least a portion of the identified images with at least a portion of the captured images. The treatment system can determine a target object and emit a fluid projectile at the target object using a treatment device.

20 Claims, 28 Drawing Sheets

(51) Int. Cl.

| | | |
|---|---|---|
| *A01G 7/06* | (2006.01) | |
| *A01C 21/00* | (2006.01) | |
| *A01C 23/00* | (2006.01) | |
| *A01M 9/00* | (2006.01) | |
| *G05B 19/4155* | (2006.01) | |
| *G06V 10/764* | (2022.01) | |
| *G06F 18/243* | (2023.01) | |
| *A01C 23/04* | (2006.01) | |
| *A01M 21/04* | (2006.01) | |
| *A01C 23/02* | (2006.01) | |

(52) U.S. Cl.
CPC ............ *A01G 7/06* (2013.01); *A01M 7/0014* (2013.01); *A01M 7/0085* (2013.01); *A01M 7/0092* (2013.01); *A01M 9/0084* (2013.01); *A01M 9/0092* (2013.01); *G05B 19/4155* (2013.01); *G06F 18/243* (2023.01); *G06V 10/764* (2022.01); *G06V 20/10* (2022.01); *G06V 20/188* (2022.01); *A01C 23/007* (2013.01); *A01C 23/023* (2013.01); *A01C 23/047* (2013.01); *A01M 7/0042* (2013.01); *A01M 21/043* (2013.01); *G05B 2219/40585* (2013.01)

(58) Field of Classification Search
CPC .............. A01M 21/043; A01M 7/0014; A01M 7/0042; A01M 7/0085; A01M 7/0089; A01M 7/0092; A01M 9/0084; A01M 9/0092; G05B 19/4155; G05B 2219/40585; G06V 10/751; G06V 10/764; G06V 20/10; G06V 20/188; G06K 9/627; G06K 9/6279

See application file for complete search history.

(56) References Cited

U.S. PATENT DOCUMENTS

| | | | |
|---|---|---|---|
| 11,120,552 B2 * | 9/2021 | Weldemariam | G06N 5/022 |
| 11,238,283 B2 * | 2/2022 | Young | G06V 20/10 |
| 11,373,288 B2 * | 6/2022 | Peters | G06T 7/0004 |
| 11,403,846 B2 * | 8/2022 | Guo | A01B 79/005 |
| 11,410,301 B2 * | 8/2022 | Barrick | G06V 20/188 |
| 2001/0016788 A1 | 8/2001 | Hauwiller et al. | |
| 2007/0100547 A1 | 5/2007 | Chang | |
| 2008/0157990 A1 | 7/2008 | Belzer et al. | |
| 2013/0129142 A1 | 5/2013 | Miranda-Steiner | |
| 2016/0223506 A1 | 8/2016 | Shriver et al. | |
| 2017/0016870 A1 | 1/2017 | McPeek | |
| 2017/0030877 A1 | 2/2017 | Miresmailli et al. | |
| 2017/0223947 A1 * | 8/2017 | Gall | A01B 79/005 |
| 2017/0278159 A1 | 9/2017 | Chung | |
| 2017/0328716 A1 | 11/2017 | Ma | |
| 2017/0334560 A1 | 11/2017 | O'Connor et al. | |
| 2018/0160672 A1 | 6/2018 | Crinklaw et al. | |
| 2018/0330435 A1 | 11/2018 | Garg | |
| 2018/0373932 A1 | 12/2018 | Albrecht et al. | |
| 2019/0035071 A1 | 1/2019 | Klein | |
| 2019/0150357 A1 | 5/2019 | Wu et al. | |
| 2019/0303668 A1 | 10/2019 | King | |
| 2019/0362146 A1 | 11/2019 | Polzounov et al. | |
| 2020/0005063 A1 | 1/2020 | Ralls et al. | |
| 2020/0029489 A1 * | 1/2020 | Bertucci | A01B 69/008 |
| 2020/0107537 A1 | 4/2020 | Brown et al. | |
| 2020/0187406 A1 | 6/2020 | Redden | |
| 2020/0187433 A1 | 6/2020 | Redden et al. | |
| 2020/0359582 A1 | 11/2020 | Tran et al. | |
| 2020/0364456 A1 | 11/2020 | Tran et al. | |
| 2020/0364843 A1 | 11/2020 | Stueve et al. | |

OTHER PUBLICATIONS

Office Action in U.S. Appl. No. 17/073,236, dated Jan. 6, 2021.
International Search Report in PCT International Application No. PCT/US2020/061684, dated Feb. 24, 2021.

* cited by examiner

1300 ⟶

AUTONOMOUS AGRICULTURAL TREATMENT SYSTEM USING MAP BASED TARGETING OF AGRICULTURAL OBJECTS

CROSS-REFERENCE TO RELATED APPLICATIONS

This application is a continuation application of U.S. patent application Ser. No. 17/073,236, titled "AUTONOMOUS AGRICULTURAL TREATMENT SYSTEM USING MAP BASED TARGETING OF AGRICULTURAL OBJECTS" filed on Oct. 16, 2020, which is hereby incorporated by reference it its entirety.

BACKGROUND

Global human population growth is expanding at a rate projected to reach 10 billion or more persons within the next 40 years, which, in turn, will concomitantly increase demands on producers of food. To support such population growth, food production, for example on farms and orchards, need to generate collectively an amount of food that is equivalent to an amount that the entire human race, from the beginning of time, has consumed up to that point in time. Many obstacles and impediments, however, likely need to be overcome or resolved to feed future generations in a sustainable manner.

To support such an increase in demand, agricultural technology has been implemented to more effectively and efficiently grow crops, raise livestock, and cultivate land. Such technology in the past has helped to more effectively and efficiently use labor, use tools and machinery, and reduce the amount of chemicals used on plants and cultivated land.

However, many techniques used currently for producing and harvesting crops are only incremental steps from a previous technique. The amount of land, chemicals, time, labor, and other costs to the industry still pose a challenge. A new and improved system and method of performing agricultural services is needed.

SUMMARY

Various embodiments of an apparatus, methods, systems and computer program products described herein are directed to an agricultural observation and treatment system. The agricultural observation and treatment system may include one or more cameras and light emitting devices for obtaining imagery of agricultural objects of a geographic scene. A treatment device may be mounted to a gimble and configured to emit a fluid projectile at determined target objects identified in the obtained imagery. The system may include one or more tanks and an electronically controlled pump fluidly connected to the one or more tanks and the treatment device. The system may include onboard electronic circuitry, mechatronic components, sensors, processors, memory and a non-transitory computer readable storage medium comprising hardware. The electronic circuitry and processors may be configured to control operation of the sensors, cameras, light emitting devices and control actuation of the electronically controlled pump for emitting a fluid projectile at a target object.

The agricultural observation and treatment system may determine a first real-world geo-spatial location of the treatment system. The system may receive captured images depicting real-world agricultural objects of a geographic scene. The system may associate captured images with the determined geo-spatial location of the treatment system. The system may identify, from a group of stored images, images having a second real-word geo-spatial location that is proximate with the first real-world geo-spatial location. The system may compare at least a portion of the identified images with the captured images. The system may determine a target object based on the comparing of the captured images with the portions of identified images. The system may perform a treatment including emitting a projectile or a light treatment at the target object.

The agricultural observation and treatment system may utilize an object determination and object treatment engine for identification, classification, localization, and treatment of agricultural objects or crops using an onboard treatment unit. The object determination and object spraying engine leverages artificial intelligence and computer vision techniques to identify characteristics of an agricultural crop portrayed in an image(s). The image(s) may be captured in real-time by image sensors mounted upon a vehicle moving along a route proximate to a current physical location of the desired or target agricultural object. The artificial intelligence techniques can be configured to detect agricultural objects as well as label the agricultural objects portrayed in the image of agricultural crop that may portray a specific stage of growth of the agricultural object, such as labeling a portion of the agricultural crop that requires a treatment with a chemical-based liquid and labeling other portions that should not be sprayed.

The object determination and object spraying engine receives a labeled image that includes the objects portrayed in the captured image which are labeled with a respective identifier or label, such as an "blossom" identifier indicating a portrayal of a blossom of an agricultural object that may be a potential crop in the captured image(s). The object determination and object spraying engine determines a current physical location of the blossom based on a pixel position of the labeled blossom in the labeled image and positional data of the vehicle generated by sensors of the agricultural observation and treatment system, on the vehicle. The object determination and object treatment engine can determine treatment parameters including a selection of a treatment mixture and a trajectory for liquid projectile to travel from a current position of a nozzle mounted on the vehicle towards the current physical location of the agricultural object. The object determination and object treatment engine can trigger initiation of emitting a chemical treatment to the blossom by sending an amount of a fluid chemical projectile from the nozzle along a trajectory in order to reach a precise location on the surface of the example blossom.

According to various embodiments, agricultural treatment system can, from a vehicle, send a request for one or more object identifiers. The request may be associated with one or more images captured by at least one camera mounted on the vehicle. The respective captured image can correspond with a physical location of an object determined by the agricultural treatment system and associate the physical location determined with the image captured. The object determination and object spraying engine receives one or more labeled images. The respective labeled image corresponds with the physical location and an identifier of the object. The object determination and object spraying engine generates positional data based on the respective labeled image. The positional data may be associated with a trajectory for a projectile to travel from a nozzle mounted on the vehicle towards the physical location of the object. The object determination and object spraying engine sends the projectile from the nozzle towards the physical location of the object according to the trajectory.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
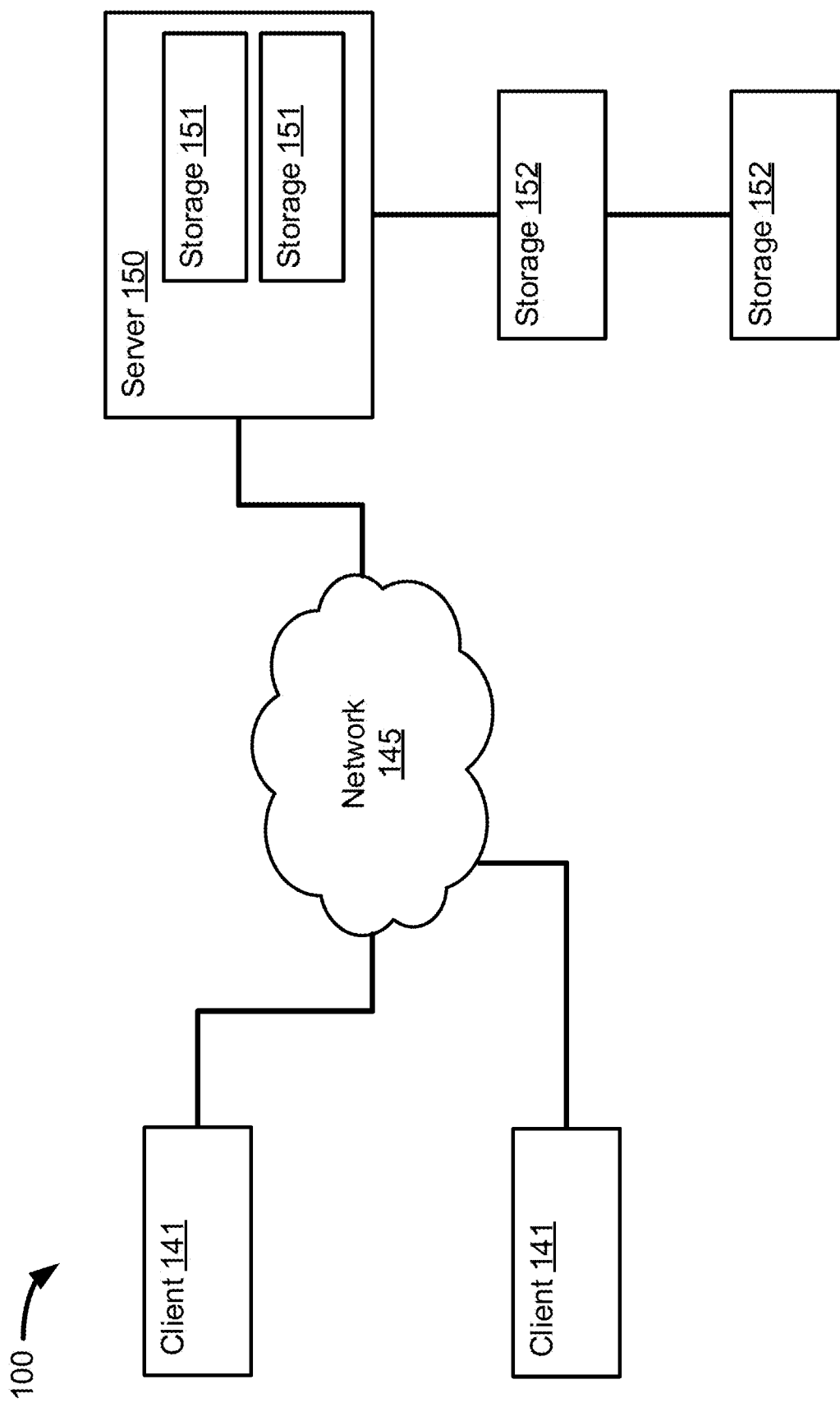
FIG. 1 is a diagram illustrating an exemplary environment, according to some examples.

In this specification, reference is made in detail to specific embodiments of the disclosure. Some of the embodiments or their aspects are illustrated in the drawings.

For clarity in explanation, the disclosure has been described with reference to specific embodiments, however it should be understood that the disclosure is not limited to the described embodiments. On the contrary, the disclosure covers alternatives, modifications, and equivalents as may be included within its scope as defined by any patent claims. The following embodiments of the disclosure are set forth without any loss of generality to, and without imposing limitations on, the claimed disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein. Various examples and embodiments described below relate generally to robotics, autonomous driving systems, and autonomous agricultural application systems, such as an autonomous agricultural observation and treatment system, utilizing computer software and systems, computer vision and automation to autonomously identify an agricultural object including any and all unique growth stages of agricultural objects identified, including crops or other plants or portions of a plant, characteristics and objects of a scene or geographic boundary, environment characteristics, or a combination thereof.

Additionally, the systems, robots, computer software and systems, applications using computer vision and automation, or a combination thereof, can be configured observe a geographic boundary having one or more plants growing agricultural objects identified as potential crops, detect specific agricultural objects to each individual plant and portions of the plant, determine that one or more specific individual agricultural object in the real world geographic boundary requires a treatment based on its growth stage and treatment history from previous observations and treatment, and to deliver a specific treatment to each of the desired agricultural objects, among other objects. Generally, the computer system provides computer vision functionality using stereoscopic digital cameras and performs object detection and classification and apply a chemical treatment to target objects that are potential crops via an integrated onboard observation and treatment system. The system utilizes one or more image sensors, including stereoscopic cameras to obtain digital imagery, including 3D imagery of an agricultural scene such as a tree in an orchard or a row of plants on a farm while the system moves along a path near the crops. Onboard lights sources, such as LEDs, may be used by the system to provide a consistent level of illumination of the crops while imagery of the crops is being obtained by the image sensors. The system can then identify and recognize different types of objects in the imagery. Based on detected types of objects in the digital imagery, or the same object from one moment in time to another moment in time experiencing a different growth stage which can be recognized, observed, and identified by the on system, as well as the system associating the growth stage or the different label with a unique individual agricultural object previously identified and located at previous growth stage, the system can apply a treatment, for example spray the real-world object with chemicals pumped from one or more liquid tanks, onto a surface of the agricultural object. The system may optionally use one or more additional image sensors to record the treatment, as a projectile, as it is applied from the system to the agricultural object in proximity to the system.

Referring now to FIG. 1, a diagram of an exemplary network environment in which example systems and devices may operate is shown. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles, or other ground mobility units configured to support a server 150, and between a base station and one or more control centers as described herein may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some examples, the clients 141 and 142 may communicate with each other as well as the servers. Also, the server 150 may communicate with other servers.

The network 145 may be, for example, local area network (LAN), wide area network (WAN), networks utilizing 5G wireless standards technology, telephone networks, wireless networks, intranets, the Internet, or combinations of networks. The server 150 may be connected to storage 152 over a connection medium, which may be a bus, crossbar, network, wireless communication interface, or other interconnect. Storage 152 may be implemented as a network of multiple storage devices, though it is illustrated as a single entity. Storage 152 may be a file system, disk, database, or other storage.

In one example, the client 141 may perform one or more methods herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle, or a system or apparatus supported by a vehicle, that sends vehicle sensor data. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system). In one example, the vehicle can be an electric, gasoline, hydrogen, or hybrid powered vehicle including an all-terrain vehicle, a truck, a tractor, a small rover with bogey rocker system, an aerial vehicle such as a drone or small unmanned aerial system capable of supporting a treatment system including vision components, chemical deposition components, and compute components.

In accordance with the above discussion, embodiments can be used to store a file on local storage such as a disk or solid-state drive, or on a removable medium like a flash drive. Furthermore, embodiments may be used to store a file on an external storage device connected to a computer over a connection medium such as a bus, crossbar, network, wireless communication interface, or other interconnect. In addition, embodiments can be used to store a file on a remote server or on a storage device accessible to the remote server.

Furthermore, cloud computing and edge computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user. Edge computing utilizes processing, storage, transfer, and receiving data at a remote server more local to where most, or a desired portion of the data may be processed, stored, and transferred to and from another server, including a central hub or at each geographic boundary where data is captured, processed, stored, transmitted, and received.

Figure 2:
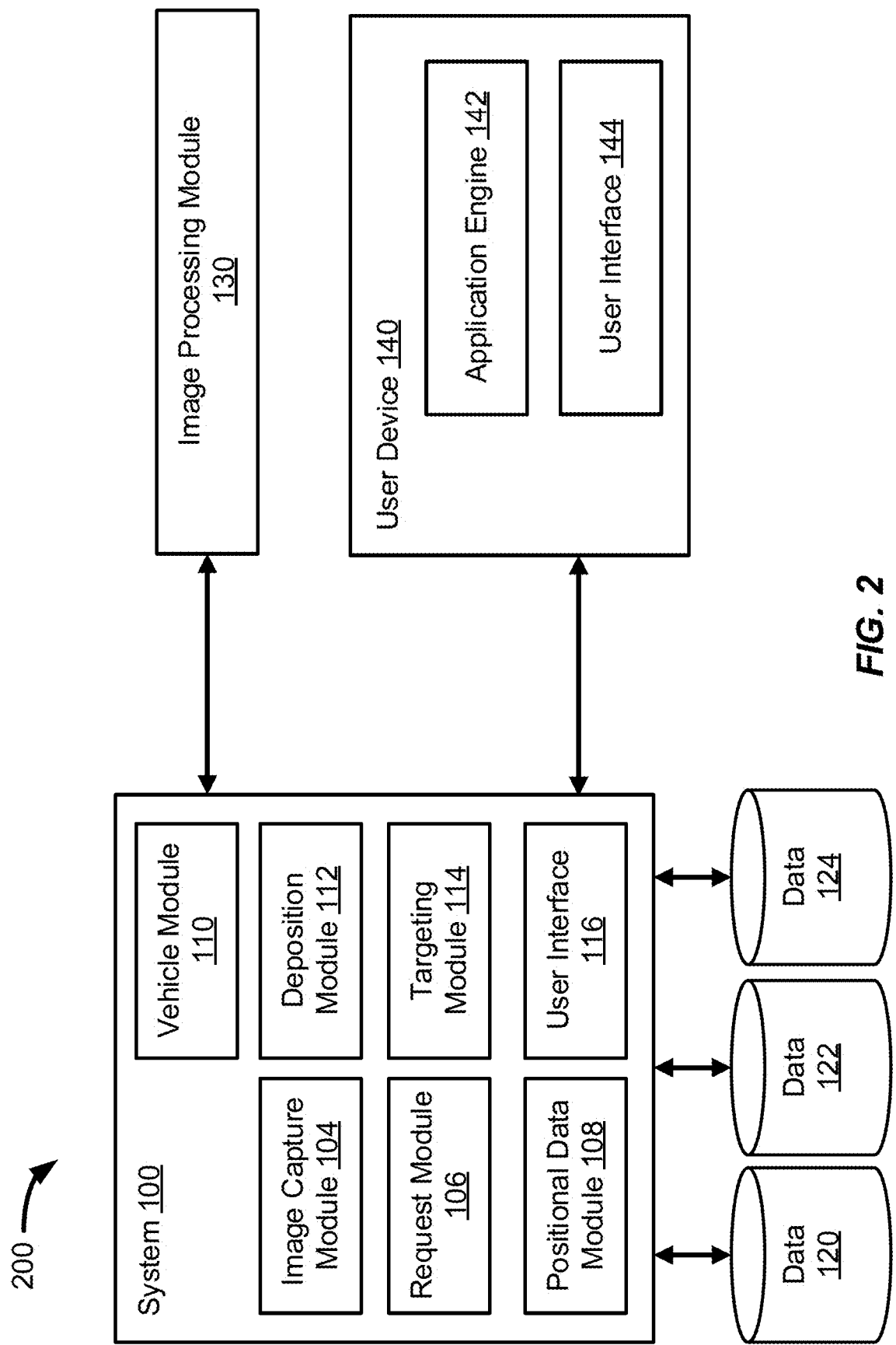
FIG. 2 is a diagram illustrating an exemplary environment, according to some examples.

FIG. 2 illustrates a block diagram 200 of an example system 100 configured to observe a geographic boundary in the real-world, for example a farm or orchard, perform object detection, classification, identification, of any and all objects in the geographic boundary including agricultural objects, determine any individual agricultural object that may require an agricultural treatment based on the agricultural object's growth stage, previous treatments applied, and other characteristics observed, particularly at the point in time of the observation by system 100, and apply a specific treatment to the agricultural object. The system 100 can include and object observation and treatment engine that includes an image capture module 104, a request module 106, a positional data module 108 for capturing, fusing, and transmitting sensor data related to position, localization, pose, velocity, and other position related signals to the rest of the system 100, a vehicle module 110, a deposition module 112 for applying a liquid or light treatment on each individual object detected and determined to require a treatment, a targeting module 114 for targeting and tracking an identified object in the real-world based on sensor data and object detection in an image captured of the real-world while a vehicle is moving, and a user interface (U.I.) module 116. The system 100 may communicate with a user device 140 to display output, via a user interface 144 generated by an application engine 142.

The system 100 can also include an image processing module 130, either on board a vehicle supporting the system 100, part of the system 100, embedded in the system 100, or supported by one or more servers or computing devices remote from the vehicle supporting the system 100. The image processing module 130 can be configured to process any and all images or other sensor data captured by the system 100 including feature extraction, object identification, detection, and classification, image matching, comparing, and corresponding with other images received simultaneously or previously of the same location, labelling unique features in each of the images, or a combination thereof.

Additionally, the image capture module 104 of the system 100 may perform functionalities similar to functionalities described below and illustrated in FIGS. 4, 5, 6, 8, 9, 12, 13, 14, and 15.

The request module 106 of the system 100 may perform functionalities similar to functionalities described below and illustrated in FIGS. 4, 5, 6, 8, 9, 12, 13, 14, and 15. The request module 106 may send request for and receive one or more labeled images from a remote image processing module (or system(s)) 130.

The positional data module 108 of the system 100 may perform functionalities similar to functionalities described below and illustrated in FIGS. 4, 5, 6, 8, 9, 12, 13, 14, and 15.

The vehicle module 110 of the system 100 may perform functionalities similar to functionalities described below and illustrated in FIGS. 4, 5, 6, 8, 9, 12, 13, 14, and 15.

The deposition module 112 of the system 100 may perform functionalities similar to functionalities described below and illustrated in FIGS. 4, 5, 6, 8, 9, 12, 13, 14, and 15.

The targeting module 114 of the system 100 may perform functionalities similar to functionalities described below and illustrated in FIGS. 4, 5, 6, 8, 9, 12, 13, 14, and 15.

The user interface module 116 of the system 100 may display information based on functionality as illustrated in FIGS. 4, 5, 6, 8, 9, 12, 13, 14, and 15.

While the databases 120, 122 and 124 are displayed separately, the databases and information maintained in a database may be combined together or further separated in a manner that promotes retrieval and storage efficiency and/or data security.

Figure 3:
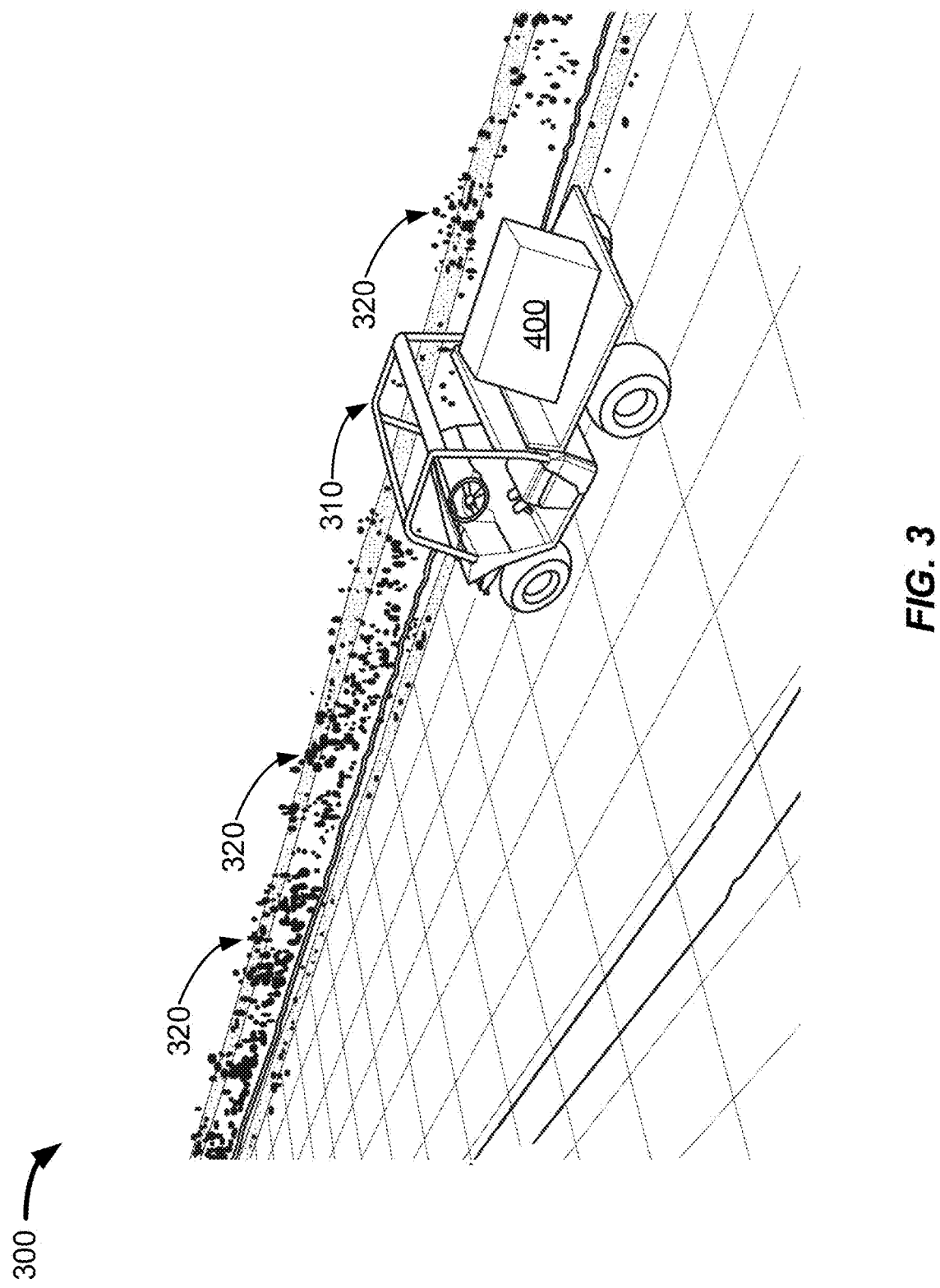
FIG. 3 is a diagram illustrating image acquisition and digitization of a geographic boundary, according to some examples.

FIG. 3 illustrates a diagram 300 depicting a portion of a virtual and digitized geographic boundary generated by a vehicle 310 with an agricultural observation and treatment system, agricultural treatment system 400, or treatment system, used to obtain imagery of an agricultural scene and spray agricultural objects, and building the virtual geographic boundary illustrated by diagram 300. In general, the vehicle 310 moves along a path while the agricultural observation and agricultural treatment system 400 obtains imagery of the external environment. Each of the points along the path represent external agricultural objects (e.g., plants, crops, trees, etc.).

In this example, the vehicle 310 may have an onboard object determination and object treatment engine. The vehicle 310 may travel along a route proximate to the external agricultural objects of a geographic scene. The object determination and object treatment engine captures images of the agricultural objects via onboard cameras. For example, as the vehicle 310 passes by a particular agricultural object, the object determination and object treatment engine capture an image(s). As will be further described below, the agricultural observation and agricultural treatment system 400 may use the captured image of an agricultural object and determine which agricultural objects are to be emitted with a fluid projectile. The agricultural treatment system 400 may emit an amount of fluid along a trajectory such that the fluid comes into contact with a particular portion of a targeted agricultural object. The diagram 300 indicates a plurality of mapped images 320, or images patches, that may have been obtained by the system 400. Each of the images 320 may have an associated geo-graphic data associated to the image, including position data, orientation and pose estimation, relative to the geographic boundary view, relative to physical components of the agricultural treatment system 400, including image sensors, or treatment engines, or relative to other agricultural objects. In one example, each of the images 320 can include full frame images captured by one or more cameras in the agricultural treatment system. The full frames can be 2D or 3D image showing the images captured directly by one or more cameras and/or rendered by the agricultural treatment system 400. The images can include images captured a few meters away from the physical surface and position of agricultural objects in the geographic boundary, which can include images of a plurality of individual agricultural objects, that are potential crops, as well as landmarks including objects or scenery, or other objects of interest including calibration targets and markers or other farming equipment, devices, structures, or machinery typically found on a farm. The image 320 can also include specific patches within captured full frame images. The patches can be identified by the agricultural system 400 detecting, classifying, identifying features, and labelling specific portions of a full image frame, including labelling agricultural objects and specific stages of growth of agricultural objects. The images can be extracted as a patch so that each individual image or visual representation of each individual and unique agricultural object on a geographic boundary can be identified and indexed, along with its position data, treatment history if any on the specific marked and identified agricultural object, as well as timestamps associated with the image captured, position captured, treatment applied, or a combination thereof.

In one example, the system may present a user interface showing the points of the images 320, and the user interface may provide for the user selection of the image points 320. Upon selection of the image point 320, the user interface would display an image associated with the point selected as a pixelated 2-dimensional or 3-dimensional image with localization information. In one example, the point selected can also include treatment history if any on the specific marked and identified agricultural object, as well as timestamps associated with the image captured, position captured, treatment applied, or a combination thereof. The configuration of the system 400 and the processes for image acquisition, target object determination and target object spraying are further described herein.

In one example, the agricultural treatment system 400, or similar system 100, can build one or more graphical visualizations and constructing an animation of a virtual geographic boundary based on each individual images captures, for example a simulated virtual farm or orchard having each agricultural object detected in space based on the images and location data of each object detected in a real-world geographic boundary, with each agricultural object, or other objects in the geographic boundary, animated and imposed in the simulated virtual geographic boundary.

In this example, a user, through the user interface 116 on board the system 100 or user interface 144 of the user device 140 can access the virtual geographic boundary and view each individual agricultural object in the virtual geographic boundary. Each animated agricultural object, or representation of an agricultural object can be positioned in the virtual geographic boundary with coordinates that are associated with its real-world location within the real-world geographic boundary. Each animated agricultural object, or representation of the agricultural object can include data representing at least one image captured by an image sensor of the agricultural object in the real world, a localization data representing the position of the agricultural object relative to the geographic boundary itself, the position of the agricultural object relative to the system 100 that captured an image of the individual agricultural object, or its position relative to other agricultural objects also with position data associated with the agricultural objects, as well as a timestamp of when the image and location data was acquired.

In one example, one or more agricultural object detected in the real-world will change characteristics such that the system 100 can detect a new feature of the agricultural object and assign a label or identifier to the agricultural object that had a different label or identifier previously assigned to the same agricultural object having the same or similar position detected in the geographic boundary. This is due to a portion of a potential crop growing on a plant, for example a lateral, changing characteristics due to the growth stage of the plant. As a simplified example, a fruiting tree can have buds on the tree's laterals which can turn into flowers, and then eventually a fruitlet, and then a fruit, for example. Each of these features can be detected and labelled by the system 100. Additionally, each of these features can be associated with each other, particularly for labeled features of agricultural objects that have the same position detected in the real world, or similar image features from a previous trial of when the system 100 captured images of the specific agricultural object, or a combination thereof.

In one example, the simulated geographic boundary, at each position in the virtual world where there is a representation of an agricultural object, can have multiple images of the same agricultural object based on the system 100 capturing multiple images at different angles, positions, or orientations, with different poses, as the system 100 scans across the geographic boundary and captures images of the agricultural object from one trial of capturing images as another. In another example, because some of the one or more agricultural objects detected will grow into crops or other stages of growth for the portion of the particular agricultural objects, each being detected, identified, and assigned a label by the system 100, a visual or other representation of each agricultural object represented in the simulated geographic boundary, can have images of the same location or images of the same agricultural object taken at a progressing period of time, such that a series of the images traversed by time in the same location (instead of by space of a moving vehicle on the same trial), will be of the same agricultural object changing characteristics as the user moves from one image to the next of the stored images of the same agricultural object.

In one example, a stereo vision system in the image capture module 104 can take images of objects in space and superimpose a 3D model of the object. In one example, the generated 3D model of the objects detected, including agricultural objects, at each of its labelled growth stages, can be positioned in the virtual geographic boundary for a user to scan through a see via the user interface 144.

As a user selects the individual agricultural object in the user interface, either within a virtual geographic boundary displayed on the user device 140, or an application that displays the representations of a digitized geographic boundary, indexed by image data representing agricultural objects having labels of different growth stages, each having a coordinate position associated with the agricultural object, and a timestamp and treatment history, the user can view one or more images, 2d models, 3D models, or a combination thereof, of visualizations, image data, position data, treatment history, and a time of data acquisition of each individual agricultural object detected on a geographic boundary.

For example, a user can select a position in the virtual geographic boundary that has an image or other visual representation, or other type of representation, of the agricultural object of a fruit tree. The selection will allow the user to view any and all images taken of a unique agricultural objected detected in the real-world. In one example, the user device 140 or system 100 can display, from a selection of an agricultural object on the user device 140, either in an application listing the indexed agricultural objects, or visually in a simulated virtual geographic boundary displayed on the user interface 144. The system 100 can display each of the images taken of a particular agricultural object in the real-world and display the images in order of time taken. This would give the effect, in some instances, of displaying a growth sequence of an agricultural object from a dormant phase, to a fully grown crop. Since the system 100 would have taken and received image capture data for each growth stage of each individual agricultural object in the geographic boundary, the user can see a time lapse displayed on the user device 140 of the agricultural object growing from formation, such as a bud forming from a lateral of a tree, to a full fruit for harvest. In this example, the system 100 can determine a size, color, density, growth trajectory, health, diseases, as well as treatment parameters including type, volume, concentration, for any fluid projectile treatments on each individual agricultural object or crop throughout the life cycle of each individual crop on geographic boundary. This would also allow the system 100 to generate yield estimation of a harvest based on calculating and accounting for yield and crop count on every individual agricultural object that can potentially turn into a crop.

Additionally, capturing image and position data, and associating treatment history and logging the time of each image capture, or treatment performed, or both, to check on crop characteristics of each individual agricultural object can be configured to optimize cultivating, growing, and harvesting crops for consumption. In one example, one or more agricultural objects, detected by the system 100, of the same type on the same tree as that of one or more other agricultural objects may grow slower than that of the other agricultural objects. In this example, the system 100 can account for the different growth stages of each individual crop units in the geographic boundary and apply a unique profile of treatment parameters optimized for the specific individual treatment of the individual agricultural object. This can effectively either speed up the growth of some objects or slow down the growth in other objects to optimize and more efficiently harvest the crop when the crops are in condition for harvest. In another example, the system 100 can determine that some agricultural objects detected, due to its current characteristics shown and identified by the system 100, may not be worth treating for harvest at a future time. The system 100 can adjust treatment parameters and either emit treatment for removing the object or stopping growth of the object, or abandon treatment so that even when the system 100 detects the object in space at a future trial, the system 100 can refrain from applying treatment to more efficiently and effectively grow and optimize other crops on the same geographic boundary or same plant.

In one example, the system 100 can store the captured and labelled image data, attached with a localization and position coordinates in a geographic boundary, and a timestamp associated with the image and location data, and selected by a user to view via the user interface 144 or by the image processing module 130 or components of the system 100, including a request module 106, deposition module 112 to process the The agricultural objects can be any number of objects and features detected in the image by an agricultural treatment system including different varieties of plants, different stages of different varieties of plants, target plants to treat including treating plants to turn into a crop or treating plats, plants for plant removal or stopping or controlling the growth rate of a plant, that are considered crops and can be treated with different treatment parameters. Other objects detected and observed by a treatment system can include landmarks in the scene including trees and portions of trees including spurs, stems, shoots, laterals, specific portions of the terrain including dirt, soil, water, mud, etc., trellises, wires, and other farming materials used for agriculture. In this example, an agricultural object of interest can be a target plant for growing into a harvestable crop. In one example, the agricultural object of interest can be a target plant to remove, such as that of a weed, or any plant that is not a crop. In one example, the agricultural object can be portions of a soil of interest to observe and cultivate, such that at least a portion of the cultivating process is treating the soil with one or more fluid chemical treatments. The agricultural object can be detected with a machine vision system and algorithm embedded in an autonomous treatment system, similar to that of system 100, or agricultural treatment system 400 (described in detail below) having an indexed repository of images including labelled features in images related to the same or similar agricultural objects, each with location data, timestamps of when the image was taken, and treatment history of each individual agricultural object detected and indexed.

Figure 4:
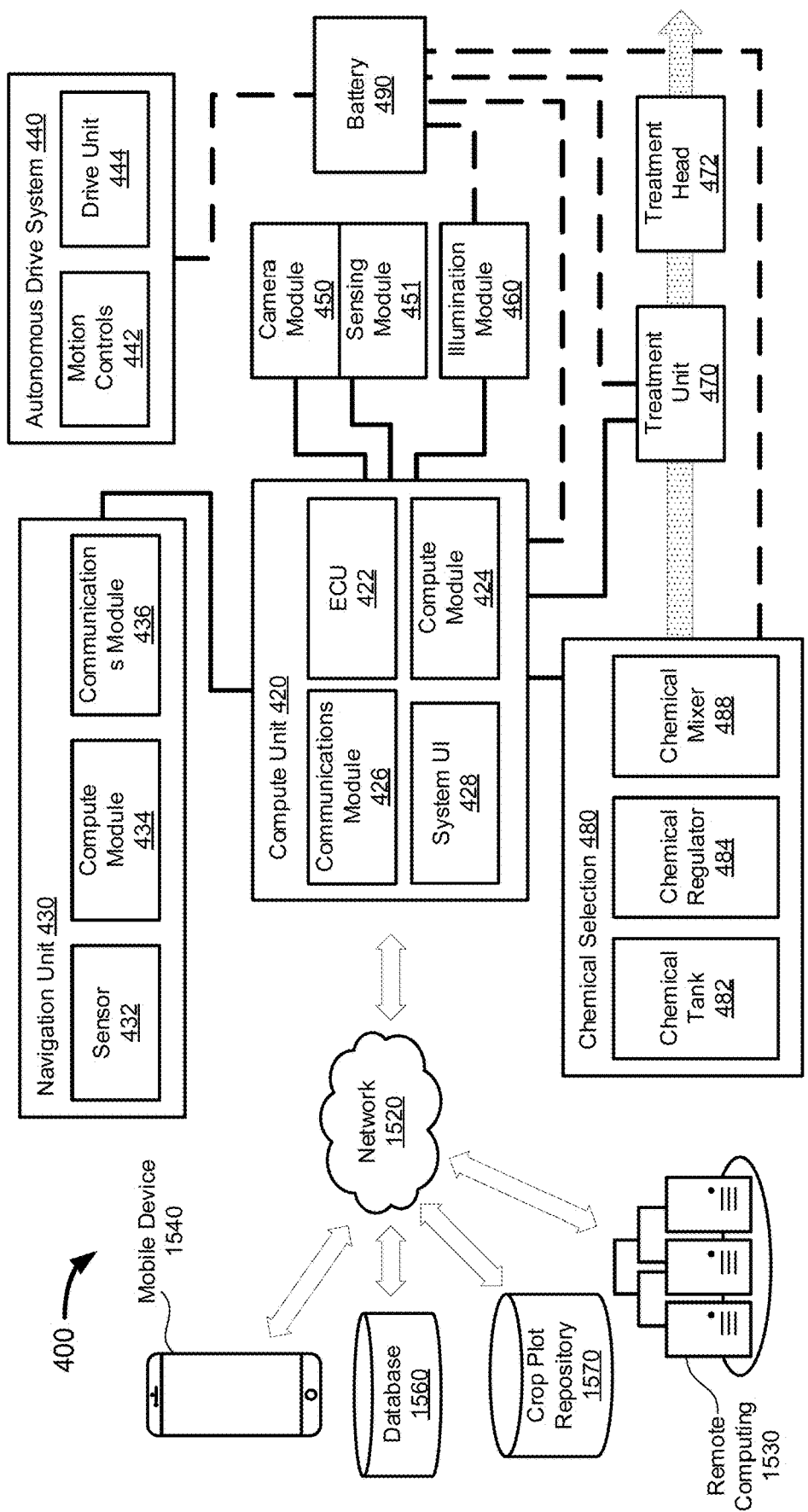
FIG. 4 is a diagram illustrating an example agricultural observation and treatment system, according to some examples.

FIG. 4 illustrates a system architecture of an agricultural observation and treatment system, or agricultural treatment system 400, or treatment system. The agricultural treatment system 400 can include a robot having a plurality of computing, control, sensing, navigation, process, power, and network modules, configured to observe a plant, soil, agricultural environment, treat a plant, soil, agricultural environment, or a combination thereof, such as treating a plant for growth, fertilizing, pollenating, protecting and treating its health, thinning, harvesting, or treating a plant for the removal of unwanted plants or organisms, or stopping growth on certain identified plants or portions of a plant, or a combination thereof.

The systems, robots, computer software and systems, applications using computer vision and automation, or a combination thereof, can be implemented using data science and data analysis, including machine learning, deep learning including convolutional neural nets ("CNNs"), deep neural nets ("DNNs"), and other disciplines of computer-based artificial intelligence, as well as computer-vision techniques used to compare and correspond features or portions of one or more images, including 2D and 3D images, to facilitate detection, identification, classification, and treatment of individual agricultural objects, perform and implement visualization, mapping, pose of an agricultural object or of the robotic system, and/or navigation applications using simultaneous localization and mapping (SLAM) systems and algorithms, visual odometry systems and algorithms, including stereo visual odometry, or a combination thereof, receive and fuse sensor data with sensing technologies to provide perception, navigation, mapping, visualization, mobility, tracking, targeting, with sensing devices including cameras, depth sensing cameras or other depth sensors, black and white cameras, color cameras including RGB cameras, RGB-D cameras, infrared cameras, line scan cameras, area scan cameras, rolling shutter and global shutter cameras, optoelectric sensors, photooptic sensors, light detection and ranging sensors (LiDar) including spinning LiDar, flash LiDar, static LiDar, etc., lasers, radar sensors, sonar sensors, radio sensors, ultrasonic sensors and rangefinders, other range sensors, photoelectric sensors, global positioning systems (GPS), inertial measurement units (IMU) including gyroscopes, accelerometers, and magnetometers, or a combination thereof, speedometers, wheel odometry sensors and encoders, wind sensor, stereo vision systems and multi-camera systems, omni-directional vision systems, wired and wireless communications systems and network communications systems including 5G wireless communications, computing systems including on-board computing, mobile computing, edge computing, cloud and cloudlet computing, fog computing, and other centralized and decentralized computing systems and methods, as well as vehicle and autonomous vehicle technologies including associated mechanical, electrical and electronic hardware. The systems, robots, computer software and systems, applications using computer vision and automation, or a combination thereof, described above, can be applied, for example, among objects in a geographic boundary to observe, identify, index with timestamps and history, and/or apply any number of treatments to objects, and, more specifically, of an agricultural delivery system configured to observe, identify, index, and/or apply, for example, an agricultural treatment to an identified agricultural object based on its location in the real-world geographic boundary, growth stage, and any and all treatment history.

In this example, the agricultural treatment system 400 agricultural treatment system 400 can include an on-board computing unit 420, such compute unit 420 computing unit embedded with a system on chip. The on-board computing unit can include a compute module 424 configured to process images, send and receive instructions from and to various components on-board a vehicle supporting the agricultural treatment system 400 agricultural treatment system 400. The computing unit can also include an engine control unit 422, a system user interface, system UI 428, and a communications module 426.

The ECU 422 can be configured to control, manage, and regulate various electrical components related to sensing and environment that the agricultural treatment system 400 will maneuver in, electrical components related to orienting the physical components of the agricultural treatment system 400, moving the agricultural treatment system 400, and other signals related to managing power and the activation of electrical components in the treatment system. The ECU 422 can also be configured to synchronize the activation and deactivation of certain components of the agricultural treatment system 400 such as activating and deactivating the illumination module 460, and synchronize the illumination module 460 with one or more cameras of the camera module 450 or one or more other sensors of the sensing module 451 for sensing an agricultural scene for observation and treatment of agricultural objects.

The compute module 424 can include computing devices and components configured to receive and process image data from image sensors or other components. In this example, the compute module 424 can process images, compare images, identify, locate, and classify features in the images including classification of objects such as agricultural objects, landmarks, or scenes, as well as identify location, pose estimation, or both, of an object in the real world based on the calculations and determinations generated by compute module 424 on the images and other sensor data fused with the image data. The communications module 426, as well as any telemetry modules on the computing unit, can be configured to receive and transmit data, including sensing signals, rendered images, indexed images, classifications of objects within images, data related to navigation and location, videos, agricultural data including crop yield estimation, crop health, cluster count, amount of pollination required, crop status, size, color, density, etc., and processed either on a computer or computing device on-board the vehicle, such as one or more computing devices or components for the compute module 424, or remotely from a remote device close to the device on-board the vehicle or at a distance farther away from the agricultural scene or environment that the agricultural treatment system 400 maneuvers on.

For example, the communications module 426 can communicate signals, through a network 1520 such as a wired network, wireless network, Bluetooth network, wireless network under 5G wireless standards technology, radio, cellular, etc. to edge and cloud computing devices including a mobile device 1540, a device for remote computing of data including remote computing 1530, databases storing image and other sensor data of crops such as crop plot repository 1570, or other databases storing information related to agricultural objects, scenes, environments, images and videos related to agricultural objects and terrain, training data for machine learning algorithms, raw data captured by image capture devices or other sensing devices, processed data such as a repository of indexed images of agricultural objects. In this example, the mobile device 1540 can control the agricultural treatment system 400 through the communications module 426 as well as receive sensing signals from the telemetry module 366. The mobile device 1540 can also process images and store the processed images in the databases 1560 or crop plot repository 1570, or back onto the on-board computing system of agricultural treatment system 400. In one example, remote computing 1530 component can be one or more computing devices dedicated to process images and sensing signals and storing them, transferring the processed information to the database 1560, or back to the on-board computing device of agricultural treatment system 400 through the network 1520.

In one example, the agricultural treatment system 400 includes a navigation unit 430 with sensors 432. The navigation unit 430 can be configured to identify a pose and location of the agricultural treatment system 400, including determining the planned direction and speed of motion of the agricultural treatment system 400 in real time. The navigation unit 430 can receive sensing signals from the sensors 432. In this example, the sensing signals can include images received from cameras or LiDars. The images received can be used to generate a grid map in 2D or 3D based on simultaneous visualization and mapping (SLAM) including geometric SLAM and Spatial SLAM techniques, visual odometry, or both, of the terrain, ground scene, agricultural environment such as a farm, etc. The sensing signals from the sensors 432 can also include depth signals from depth sensing cameras including RGB-D cameras or infrared cameras, or calculated with stereo vision mounted sensors such as stereo vision cameras, as well as other signals from radar, radio, sonar signals, photoelectric and photooptic signals, as well as location sensing signals, from having a global positioning system (GPS) unit, encoders for wheel odometry, IMU's, speedometers, etc. A compute module 434, having computing components such as a system on chip or other computing device, of the navigation unit 430, or compute module 424 of the compute unit 420, or both, can fuse the sensing signals received by the sensors 432, and determine a plan of motion, such as to speed up, slow down, move laterally, turn, change the rocker orientation and suspension, move, stop, or a combination thereof, or other location, pose, and orientation-based calculations and applications to align a treatment unit 470 with the ground, particularly with an object of interest such as a target plant on the ground. In one example, the navigation unit 430 can also receive the sensing signals and navigate agricultural treatment system 400 autonomously. For example, an autonomous drive system 440 can include motion components including a drive unit 444 having motors, steering components, and other components for driving a vehicle, as well as motion controls 442 for receiving instructions from the compute module 424 or compute module 424, or both, to control the drive unit and move the vehicle, autonomously, from one location and orientation to a desired location and orientation.

In one example, the navigation unit 430 can include a communications module 436 to send and receive signals from other components of the agricultural treatment system 400 such as with the compute unit 420 or to send and receive signals from other computing devices and databases off the vehicle including remote computing devices over the network 1520.

In another example, the navigation unit 430 can receive sensing signals from a plurality of sensors including one or more cameras, Lidar, GPS, IMUs, VO cameras, SLAM sensing devices such as cameras and LiDar, lasers, rangefinders, sonar, etc., and other sensors for detecting and identifying a scene, localizing the agricultural treatment system 400 and treatment unit 470 onto the scene, and calculating and determining a distance between the treatment unit 470 and a real world agricultural object based on the signals received, fused, and processed by the navigation unit 430, or sent by the navigation unit 430 to be processed by the compute module 424, and/or another on-board computing device of the treatment system 900. The images received can be used to generate a map in 2D or 3D based on SLAM, visual odometry including geometry based or learning based visual odometry, or both, of the terrain, ground scene, agricultural environment such as a farm, etc. The sensing signals can also include depth signals, from having depth sensing cameras including RGB-D cameras or infrared cameras, a radar, radio, sonar signals, photoelectric and photooptic signals, as well as location sensing signals from GPS, encoders for wheel odometry, IMUs, speedometers, and other sensors for determining localization, mapping, and position of the agricultural treatment system 400 to objects of interest in the local environment as well as to the regional agricultural environment such as a farm or other cultivated land that has a designated boundary, world environment, or a combination thereof. The navigation unit 430 can fuse the sensing signals received by the sensors, and determine a plan of motion, such as to speed up, slow down, move laterally, turn, move, stop, change roll, pitch, and/or yaw orientation, or a combination thereof, or other location, localization, pose, and orientation-based calculations and applications.

In one example, the navigation unit 430 can include a topography module configured to utilize sensors, computer components, and circuitry configured to detect uneven surfaces on a plane or scene of the terrain which allows the topography module to communicate with the rest of the components of the treatment system to anticipate, adjust, avoid, compensate for, and other means of allowing the agricultural treatment system 400 to be aware of uneven surfaces detected on the terrain as well as identify and map unique uneven surfaces on the terrain to localize the vehicle supporting the navigation unit 430.

In one example, the agricultural treatment system 400 includes a camera module 450 having one or more cameras, sensing module 451 having other sensing devices, or both, for receiving image data or other sensing data of a ground, terrain, orchard, crops, trees, plants, or a combination thereof, for identifying agricultural objects, such as flowers, fruits, fruitlets, buds, branches, plant petals and leaves, plant pistils and stigma, plant roots, or other subcomponent of a plant, and the location, position, and pose of the agricultural objects relative to a treatment unit 470, camera module 450, or both, and its position on the ground or terrain. The cameras can be oriented to have a stereo vision such as a pair of color or black and white cameras oriented to point to the ground. Other sensors of sensing module 451 can be pointed to the ground or trees of an orchard for identifying, analyzing, and localizing agricultural objects on the terrain or farm in parallel with the cameras of the camera module 450 and can include depth sensing cameras, LiDars, radar, electrooptical sensors, lasers, etc.

In one example, the agricultural treatment system 400 can include a treatment unit 470 with a treatment head 472. In this example, the treatment unit 470 can be configured to receive instructions to point and shine a laser, through the treatment head 472, to treat a target position and location on the ground terrain relative to the treatment unit 470.

The agricultural treatment system 400 can also include motion controls 442, including one or more computing devices, components, circuitry, and controllers configured to control mechatronics and electronic components of a vehicle supporting the agricultural treatment system 400 configured to move and maneuver the agricultural treatment system 400 through a terrain or orchard having crops and other plants of interest such that, as the agricultural treatment system 400 maneuvers through the terrain, the cameras 350 are scanning through the terrain and capturing images and the treatment unit is treating unwanted plants identified in the images captured from the camera module 450 and other sensors from sensing module 451. In one example, an unwanted plant can be a weed that is undesirable for growing next or near a desirable plant such as a target crop or crop of interest. In one example, an unwanted plant can be a crop that is intentionally targeted for removal or blocking growth so that each crop growing on a specific plant or tree can be controlled and nutrients pulled from the plant can be distributed to the remaining crops in a controlled manner.

The agricultural treatment system 400 can also include one or more batteries 490 and one or configured to power the electronic components of the agricultural treatment system 400, including DC-to-DC converters to apply desired power from the battery 490 to each electronic component powered directly by the battery.

In one example, the illumination module 460 can include one or more light arrays of lights, such as LED lights. The one or more light arrays can be positioned near the one or more cameras or sensors of camera module 450 and sensor module 451 to provide artificial illumination for capturing bright images. The light arrays can be positioned to point radially, from a side of the vehicle, pointed parallel to the ground, and illuminate trees or other plants that grow upwards. The light arrays can also be positioned to be pointed down at the ground to illuminate plants on the ground such as row crops, or other plants or soil itself. The light arrays can be controlled by the ECU 422, as well as by a synchronization module, embedded in the ECU 422 or a separate electronic component or module, such that the lights only flashes to peak power and luminosity for the length of 1 frame of the camera of camera module 450, with a matched shutter speed. In one example, the lights can be configured by the ECU 422 to flash to peak power for the time length of a multiple of the shutter speed of the camera. In one example, the lights of the light array can be synchronized to the cameras with a time offset such that the instructions to activate the LED's of the light array and the instructions to turn on the camera and capture images are offset by a set time, predetermined time, or automatically calculated time based on errors and offsets detected by the compute unit 420, so that when the LED's actually activate to peak power or desired luminosity, which will be a moment in time after the moment in time the ECU sends a signal to activate the light array, the camera will also activate at the same time and capture its first image, and then both the lights and cameras will be synchronized and run at the same frequency. In one example, the length of time of the peak power of the activated light is matched and synchronized with the exposure time of each frame captured of the camera, or a multiple of the exposure time.

For example, the lights of the light array can flash with turning on, reach peak power, and turn off at a rate of 30 to 1000 Hertz (Hz). In one example, the lights can flash at 240 Hz to match one or more cameras that has a rolling shutter speed, global shutter speed, or both, of 240 Hz. In one example, the lights can flash at 240 Hz to match one or more cameras that has a rolling shutter speed, global shutter speed, or both, of 30 or 60 Hz. In one example, the lights can reach a peak power of 2.0M Lumen with a sustained peak power ON for 250 microseconds with a duty cycle of less than 10%. In one example, the color temperature of the light 170 can include the full spectrum of white light including cool, warm, neutral, cloudy, etc. In one example, the color temperature of the light can be around 5000K nm to reflect and artificially imitate the color temperature of the Sun.

In one example, the agricultural treatment system 400 can include a treatment unit 470 with a treatment head 472. In this example, the treatment unit 470 can include a turret and circuitry, electronic components and computing devices, such as one or more microcontrollers, electronic control units, FPGA, ASIC, system on chip, or other computing devices, configured to receive instructions to point and a treatment head 472, to treat a surface of a real world object in proximity of the treatment unit 470. For example, the treatment unit 470 can emit a fluid projectile of a treatment chemical onto an agricultural object in the real world based on detecting the agricultural object in an image captured and determining its location in the real world relative to the treatment unit 470.

The treatment unit 470 can include a gimbal assembly, such that the treatment head 472 can be embedded in, or supported by the gimbal assembly, effectively allowing the treatment head 472 to rotate itself and orient itself about one or more rotational axes. For example, the gimbal assembly can have a first gimbal axis, and a second gimbal axis, the first gimbal axis allowing the gimbal to rotate about a yaw axis, and the second gimbal axis allowing the gimbal to rotate about a pitch axis. In this example, a control module of the treatment unit can control the gimbal assembly which changes the rotation of the gimbal assembly about its first gimbal axis, second gimbal axis, or both. The compute module 424 can determine a location on the ground scene, terrain, or tree in an orchard, or other agricultural environment, and instruct the control module of the treatment unit 470 to rotate and orient the gimbal assembly of the treatment unit 470. In one example, the compute module 424 can determine a position and orientation for the gimbal assembly to position and orient the treatment head 472 in real time and make adjustments in the position and orientation of the treatment head 472 as the agricultural treatment system 400 is moving relative to any target plants or agricultural objects of interest on the ground either in a fixed position on the ground, or is also moving. The agricultural treatment system 400 can lock the treatment unit 470, at the treatment head 472, onto the target plant, or other agricultural object of interest through instructions received and controls performed by the control module of the treatment unit 470, to adjust the gimbal assembly to move, or keep and adjust, in real time, the line of sight of the treatment head 472 onto the target plant.

In one example, a chemical selection module, or chemical selection 480, of agricultural treatment system 400 agricultural treatment system 400 can be coupled to the compute module 424 and the treatment unit 470. The chemical selection module can be configured to receive instructions to send a chemical fluid or gas to the treatment unit 470 for treating a target plant or other object. In this example, the chemical selection module can include one or more chemical tanks 482, one or more chemical regulators 484 operable connected to the one or more chemical tanks 484 such that there is one chemical regulator for tank, a pump for each tank, and a chemical mixer 488 which can mix, in real time, chemical mixtures received from each chemical tank selected by the chemical mixer 488. In one example, a vehicle supporting the agricultural treatment system 400 agricultural treatment system 400, including the chemical selection module 480, can support one chemical tank 482, a chemical pump, a chemical regulator 486, a chemical and a chemical accumulator, in series, linking connecting a pathway for a desired chemical or liquid to travel from a stored state in a tank to the treatment unit 470 for deposition on a surface of an object. The chemical regulator 484 can be used to regulate flow and pressure of the fluid as it travels from the pump to the treatment unit. The regulator 484 can be manually set by a user and physically configure the regulator on the vehicle, or controlled by the compute unit 420 at the compute module 424 or ECU 422. The chemical regulator 484 can also automatically adjust flow and pressure of the fluid from the pump to the treatment unit 470 depending on the treatment parameters set, calculated, desired, or a combination thereof. In one example, the pump can be set to move fluid from the storage tank to the next module, component, in the series of components from the chemical tank 482 to the treatment unit 470. The pump can be set at a constant pressure that is always pressurized when the vehicle and agricultural treatment system 400 agricultural treatment system 400 is currently running a trial for plant or soil treatment. The pressure can then be regulated to controlled from the constant pressure at the regulator, and also an accumulator 487, so that a computer does not need to change the pump pressure in real time. Utilizing a regulator and accumulator can cause the pressure needed for the spray or emission of a fluid projectile to be precisely controlled, rather than controlling voltage or power of the pump. In one example, the agricultural treatment system 400 agricultural treatment system 400 will identify a target plant to spray in the real world based on image analysis of the target plant identified in an image captured in real time. The compute unit 420 can calculate a direction, orientation, and pressurization of the treatment unit 470 such that when the treatment unit 470 activates and opens a valve for the pressurized liquid to pass from the chemical selection module 480 to the treatment unit 470, a fluid projectile of a desired direction, orientation, and magnitude, from the pressure, will be emitted from the treatment unit 470 at the treatment head 472. The pump will keep the liquid stream from the chemical tank 482 to the treatment unit 470 at a constant pressure, whether or not there is flow. The chemical regulator 484 in the series of components will adjust and step down the pressure to a desired pressure controlled manually before a trial, controlled by the compute unit 420 before the trial, or controlled and changed in real time during a trial by the compute unit 420 either from remote commands from a user or automatically calculated by the compute module 424. The accumulator 487 will keep the liquid stream in series pressurized to the desired pressure adjusted and controlled by the chemical regulator 484, even after the treatment unit 470 releases and emits pressurized fluid so that the stream of fluid from the pump to the treatment unit 470 is always kept at a desired pressure without pressure drops from the release of pressurized fluid.

In one example, the chemical can be a solution of different chemical mixtures for treating a plant or soil. The chemicals can be mixed, or premixed, configured, and used as pesticides, herbicides, fungicides, insecticides, fungicides, adjuvants, growth enhancers, agents, artificial pollination, etc., or a combination thereof. In one example, water or vapor can be substituted for any of the fluid or chemical selections described above. In one example, the agricultural treatment system 400 agricultural treatment system 400 can apply powder sprays or projectiles as well as foams, gels, coatings, or other physical substances that can be emitted from a chemical spray device.

Figure 5:
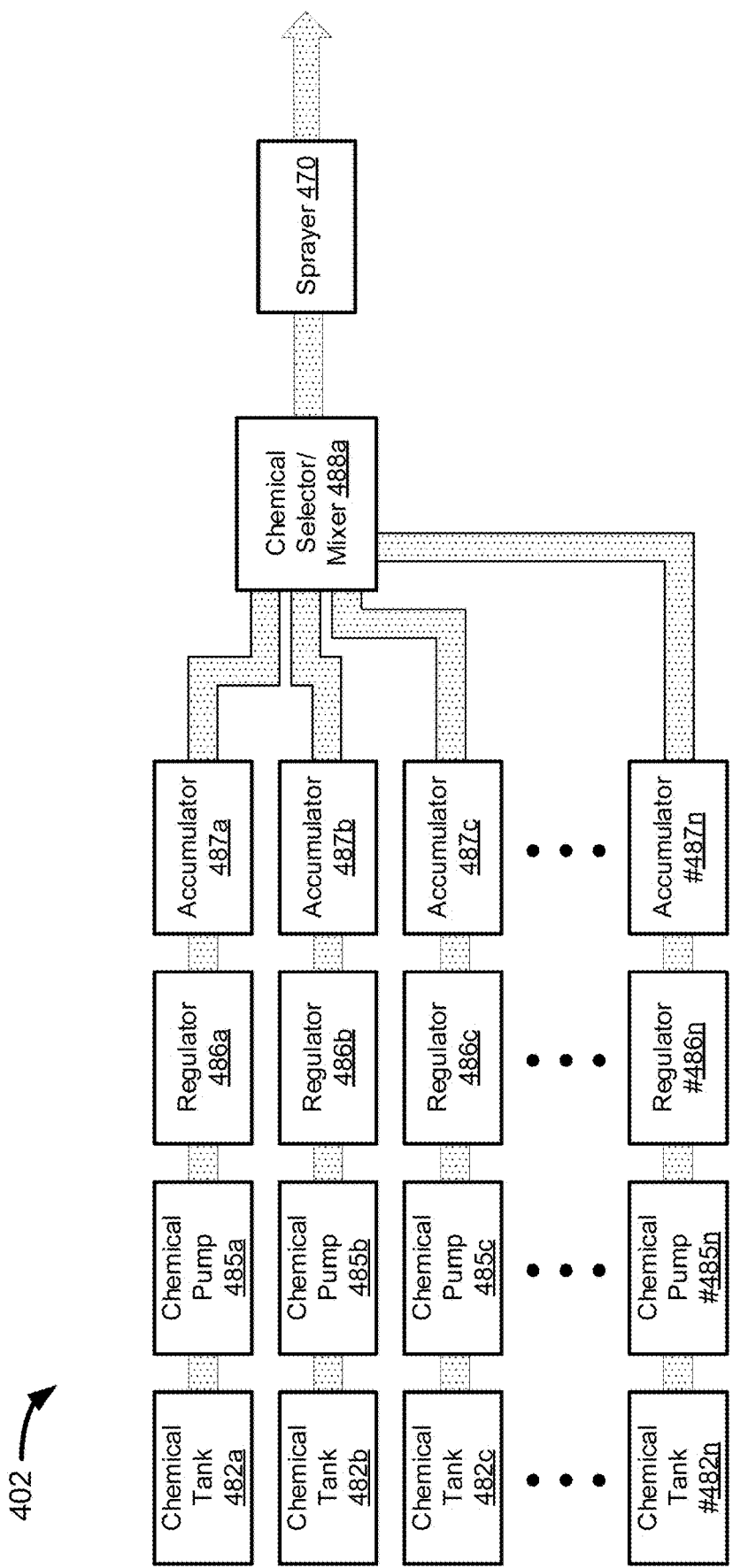
FIG. 5 is a diagram illustrating a component of an example agricultural observation and treatment system, according to some examples.
Figure 6:
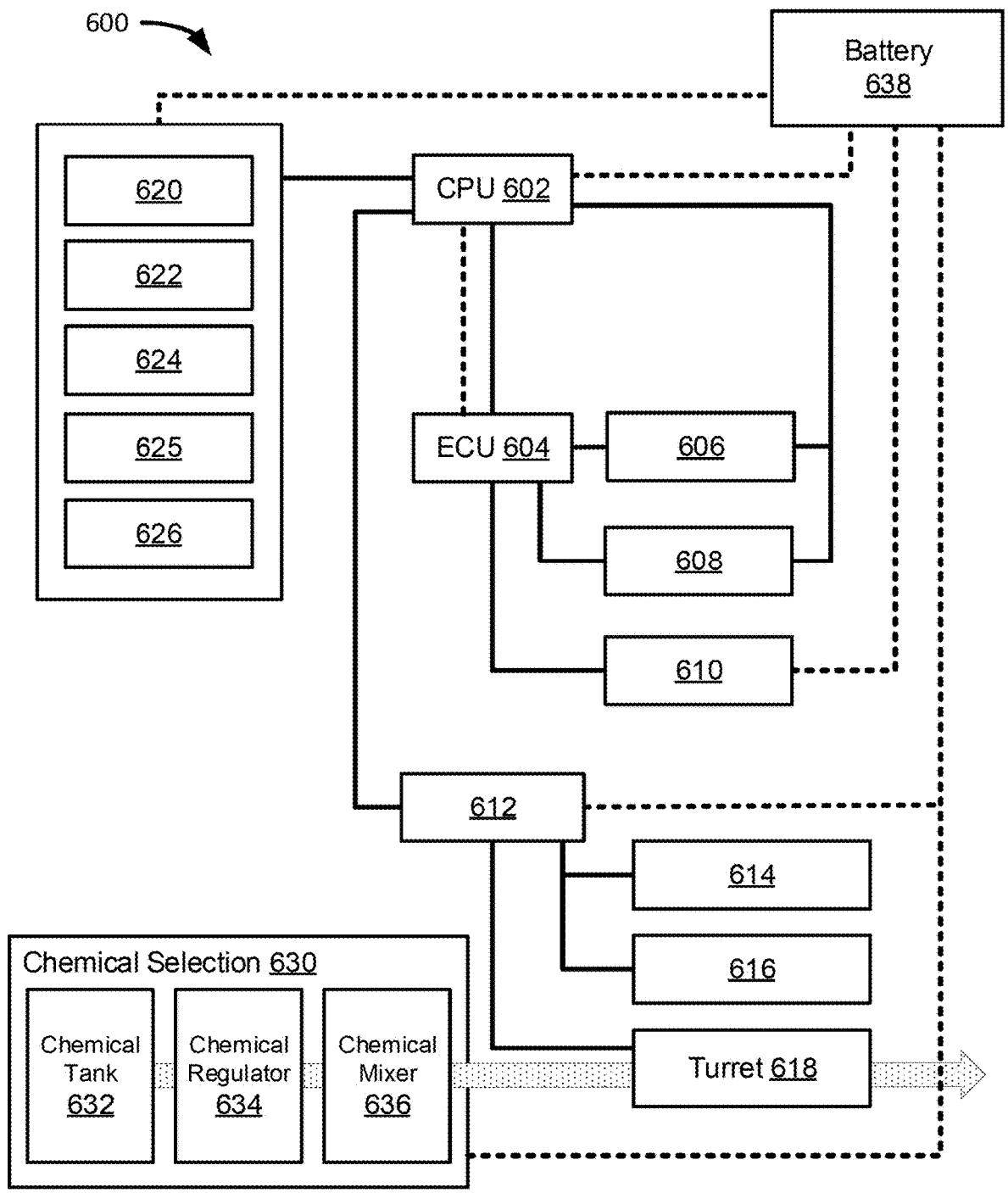
FIG. 6 is a diagram illustrating an additional example agricultural observation and treatment system, according to some examples.

FIG. 5 illustrates a system 402 for selecting and producing a chemical mixture for spraying. In one example, the system 402 can be a subsystem combined with the agricultural treatment system 400 agricultural treatment system 400 and mounted or attached to a vehicle. In one example, the system 402 can be implemented in real time such that an emitter 470 of the agricultural treatment system 400 agricultural treatment system 400 can receive instructions to target and spray and a chemical selector 488a can provide a desired chemical mixture in real time. For example, multiple series of chemical selection components can be configured such that each series of chemical selection components can be run in parallel for a chemical mixer 488a to mix chemicals, in the form of fluids, liquids, gas, powder, water, vapor, etc., in real time, and send the desired mixed chemical, in both content, proportionality, concentration, and volume to the treatment unit, or an emitter 470, to be emitted as a projectile, aerosol, mist, or a powder or liquid droplet onto a surface of an object. In one example, a first series of components for chemical selection can include a chemical tank 482a, a chemical pump 485a, a regulator 486a, an accumulator 487a, and one or more spray tubes and potential circuitry to link each of the chemical tank 482a, chemical pump 485a, regulator 486a, and accumulator 487a in series to be connected to the chemical mixer 488a. The chemical tank 482a can store a desired chemical, which can be a premixed chemical another set of chemicals. For example, the chemical tank 482a can store chemical-1. In parallel to the series of chemical selection components of 482a, 485a, 486a, and 487a, is a second series of chemical selection components including a chemical tank 482b, chemical pump 485b, regulator 486b, and accumulator 487b. The components 482b, 485b, 486b, and 487b can be connected in series with one or more spray tubes and connected to the chemical mixer 488a. The chemical tank 482b can store chemical-2, which can be different chemical mixture or concentration as that of chemical-1. In this configuration the chemical mixer 488a can select and extract, in real time on the vehicle during an observation and spray trial, either chemical-1, chemical-2, or a combination of both with varying concentrations and volume. The chemical mixer 488a can then send the mixture of chemical-1 and chemical-2 or any desired mixture of chemicals, or a chemical from only a single channel, to the emitter 470 to emit a mixed chemical projectile, droplet, aerosol, etc., at a target object. Further, any number of different chemical mixtures can be stored on-board the vehicle such that the chemical mixer 488a can extract the chemical mixture and generate a new chemical mixture for treating an object. For example, a third series of chemical selection components, including a chemical tank 482c, configured to store chemical-3, chemical pump 485c, regulator 486c, accumulator 487c, can be configured in parallel with the other two series of chemical selection components such that the chemical selector can choose from any of the three different chemicals of chemical-1, chemical-2, or chemical-3. Further, the number of chemical tanks stored is limited to only the amount that the vehicle with the agricultural treatment system 400 can support including an nth series of chemical selection components, such as chemical tank 482n, chemical pump 485n, regulator 486n, and accumulator 487n, linked in series by a spray tube and connected to the chemical mixer 488a. The chemical mixer 488a can be configured to select and receive different combinations in volumes of chemical-1, chemical-2, chemical-3, and so forth, to be sent to the emitter 470 and emit a pressurized projectile, aerosol, mist, or a powder or liquid droplet onto a surface of an object. In one example, one of the chemical tanks can store water or vapor such that the selection of the chemical tank with water is used to dilute a solution of mixed chemicals.

In one example, the emitter 470 can emit a projectile, liquid, gas, aerosol, spray, mist, fog, or other type of fluid droplet induced spray to treat a plurality of different plants in real time. An agricultural scene can include a row crop farm or orchard planted with different crops. In this example, each row of plants can include a different type of plant to by cultivated and treated such that the emitter 470 can treat one row with one type of treatment, such as a chemical mixture-1, mixed and sent to the emitter 470 by the chemical mixer 488a, and another row with another type of treatment to a different crop or plant, such as a chemical mixture-2. This vehicle movement to calculate and determine a position and orientation of the vehicle supporting the system 600. The navigation unit can also include an IMU module 622 with one or more IMU sensors, including accelerometers, gyroscopes, magnetometers, compasses, and MEM and NEM sensors to determine IMU data. The navigation unit can also include an GPS module 624 to receive GPS location data, for example up to a centimeter accuracy. The navigation unit can also include a SLAM module 625 for performing a simultaneous localization and mapping algorithm and application for mapping an environment including an agricultural geographic boundary such as a farm, orchard, or greenhouse, and determining localization and orientation of a vehicle supporting the system 600, components of the system 600 relative to the geographic boundary, as well as localization and orientation of agricultural objects and scenes detected by the system 600. The SLAM module 625 can take sensor data from one or more cameras, including stereo vision cameras, cameras that are omnidirectional, cameras that are moving relative to the vehicle, or other sensors 626 including LiDar sensors. The LiDar sensors can be flash LiDar sensors or static LiDar sensors, spinning LiDar sensors, other rangefinders, and other sensors discussed above.

The CPU 602 can send and receive data to/from a microcontroller (which may control one or more motors) 612, the microcontroller receiving instructions and power signals to change an orientation of a treatment unit having a turret 618 based on sending one or more motor commands for changing an axis orientation 614, 616 of a nozzle head of the turret 618. The treatment unit can include a turret 618 that can orient and direct a treatment head supporting a nozzle, with one or more motors that can change axis orientation 614 and 616, and point the treatment head directly at a target object, for example an agricultural object for treatment and emit a fluid projectile having a chemical mixture or water to treat the surface of an agricultural object in the real-world.

The CPU 602 to communications components to send and receive instructions to other components of the system 600 as well as remote devices. A chemical selection unit 630 can include one or more chemical pump(s) configured to receive non-pressurized liquid from one or more chemical tanks 634 and operable to the treatment unit at the turret 618. One or more chemical tanks 632 may have different types of chemicals. The chemical pumps can send stored liquid or gas from the one or more chemical tank(s) 632 to one or more regulators 634, which will further send pressurized liquid to one or more other components in series as the pressurized liquid reaches the turret 618. Other components in the series of the chemical selection unit 630 can include an accumulator and chemical mixer 636. The accumulator 626 may send pressurized liquid to the nozzle 618 and keep the liquid in series at a desired pressure as pressure from any emission of fluid by the treatment unit would drop as fluid is released into an environment from the nozzle. The treatment unit may emit the liquid at a particular trajectory in order for the liquid to come into contact with an object and at a particular physical location. A vehicle battery 638 may send power to the CPU 602 as well as other components of system 600 including the one or more illumination units 610, one or more components of the chemical selection unit 630, the treatment unit, other electronic components, and can be regulated with a converter.

Figure 7:
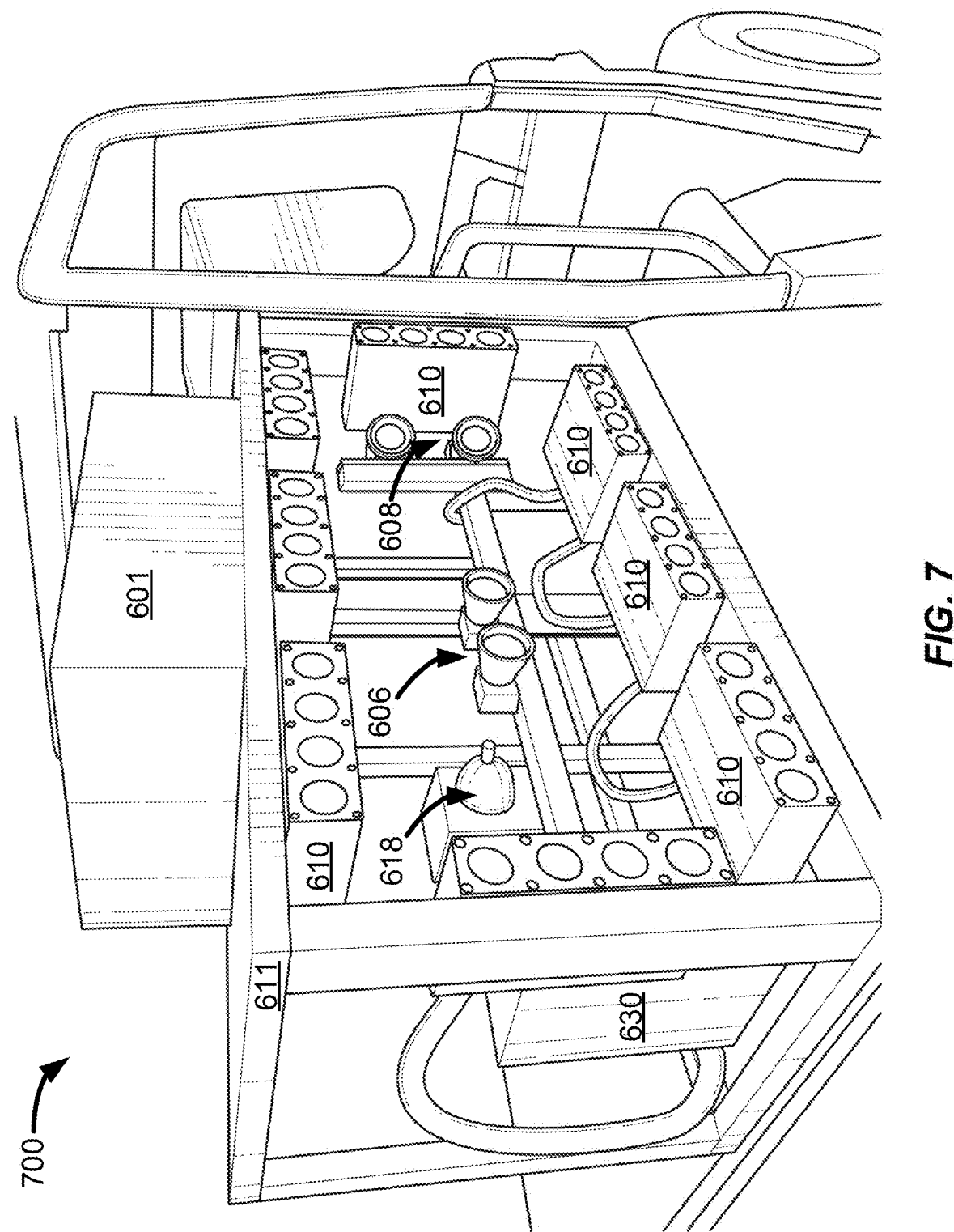
FIG. 7 is a diagram illustrating an additional example agricultural observation and treatment system, according to some examples.

FIG. 7 illustrates an example vehicle 700 configured with a system 600 as described herein. In this example, multiple illumination units 610 including light bars with one or more LEDs (e.g., illumination modules 460) are positioned at multiple locations about a frame 611 housing and supporting the system 600. For example, three units 610 are placed at a top portion of the frame, three units 610 are placed at a bottom portion of the frame, and one unit 610 is placed to the right and left of the frame such that and of the image sensing units can be surrounded by light illuminating the geographic environment. Image sensors 606 and 608 are mounted to the frame 611. A treatment unit with a turret 618 supporting a treatment head and nozzle may be mounted to the frame 611 with piping fluidly connected to the chemical selection unit 630. Electronics, such as the CPU 602, ECU 604, etc. may be enclosed in a container 601 mounted to the frame 611.

Figure 8:
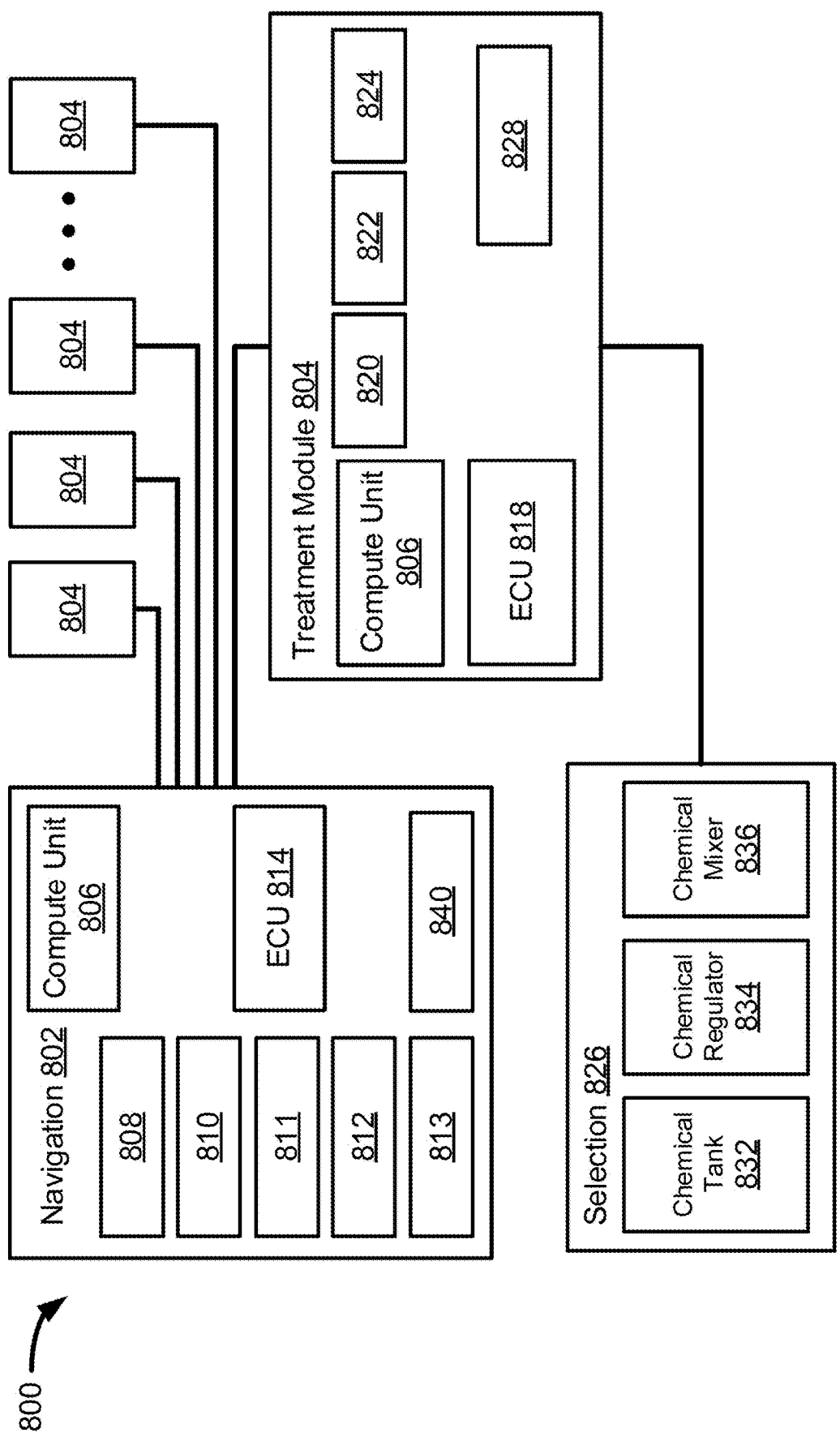
FIG. 8 is a diagram illustrating an additional example agricultural observation and treatment system, according to some examples.

FIG. 8 illustrates an example schematic block diagram of componentry that may be utilized with a system 800 similar to that of agricultural treatment system 400, system 100, and system 600 according to one embodiment. The system 800 may include a sub-system 802 that communicates with one or more perches, or treatment modules 804. The treatment module 804 can be a component of a modular system of one or more treatment devices. In each treatment module 804, the treatment module 804 can include, one or more image sensors 820 and 822, and one or more illumination units 824. The treatment module 804 can include a compute unit 806, which can include a cpu or system on chip, that sends data and instructions to an ECU 818, or daughterboard ECU, for synchronization of operation of one or more illumination units 824 and operation of image sensors 820 and 822. The ECU 818 can sends/receives data to one or more cameras of image sensors 820, and/or one or more cameras of image sensors 822, and one or more illumination units 824 each including a light bar of LEDs, including instructions by the ECU 828 to activate the image sensors 820 and 822 and illumination units 824.

The system 800 can also include a navigation unit 802 configured to interface with each treatment module 804. The navigation unit 802 can include one or more components and modules configured to receive positional, velocity, acceleration, gps, pose, orientation, and localization and mapping data. In one example, the navigation unit 802 can include a vehicle odometry module 808 with encoders and image sensors to perform wheel odometry or visual odometry and process images and vehicle movement to calculate and determine a position and orientation of the vehicle supporting the system 800. The navigation unit can also include an IMU module 810 with one or more IMU sensors, including accelerometers, gyroscopes, magnetometers, compasses, and MEM and NEM sensors to determine IMU data. The navigation unit 802 can also include an GPS module 811 to receive GPS location data, for example up to a centimeter accuracy. The navigation unit can also include a SLAM module 812 for performing a simultaneous localization and mapping algorithm and application for mapping an environment including an agricultural geographic boundary such as a farm, orchard, or greenhouse, and determining localization and orientation of a vehicle supporting the system 800, components of the system 800 relative to the geographic boundary, as well as localization and orientation of agricultural objects and scenes detected by the system 800. The SLAM module 812 can take sensor data from one or more cameras, including stereo vision cameras, cameras that are omnidirectional, cameras that are moving relative to the vehicle, or other sensors 813 including LiDar sensors. The LiDar sensors can be flash LiDar sensors or static LiDar sensors, spinning LiDar sensors, other rangefinders, and other sensors discussed above. As the navigation 802 receives sensing data related to localization and mapping, a compute unit 806, including a cpu or system on chip, of the navigation unit 802 can fuse the sensing signals and send the data to each of the treatment modules 804 or to a remote compute unit or server through a communications module 840. The sensing components of the navigation unit 802 can be activated and controlled by an ECU 814. The ECU 814 can also be configured to interface, including activation and power regulation, with each of the treatment modules 804.

The treatment module 804 can also include a treatment unit 828 configured to receive instructions from the compute unit and ecu 818 including treatment parameters and treatment trajectory of any fluid projectile that is to be emitted from the treatment unit 828. The CPU 602 to communications components to send and receive instructions to other components of the system 600 as well as remote devices. A chemical selection unit 826 can include one or more chemical pump(s) configured to receive non-pressurized liquid from one or more chemical tanks 832 and operable to each treatment units of each of the treatment modules 804, or multiple treatment units 828 of each treatment module 804. One or more chemical tanks 832 may have different types of chemicals. The chemical pumps can send stored liquid or gas from the one or more chemical tank(s) 832 to one or more regulators 834, which will further send pressurized liquid to one or more other components in series as the pressurized liquid reaches the one or more treatment units 828 of system 800. Other components in the series of the chemical selection unit 826 can include an accumulator and chemical mixer 836 (described in previous sections of the disclosure). The treatment unit may emit the liquid at a particular trajectory in order for the fluid projectile to come into contact with an object and at a particular physical location.

In one example, as a vehicle performs a trial on a geographic boundary, each of the treatment modules 804 can perform actions independently of each other. Each treatment module 804 can receive its own image acquisition and processing of images for treatment. The treatment parameters can be determined locally on each treatment module 804, including object detection and classification of agricultural objects in a scene as well as determining treatment parameters based on the objects and features detected. The processing and be performed by each compute unit 806 of each treatment module 804. Each of the treatment modules 804 can receive the same data sensed, fused, and processed by navigation, vehicle orientation and position data from the navigation unit 802 since each of the treatment modules 804 will be supported by the same vehicle. In one example, each of the treatment modules 804 can share the same chemical selection component 826. In one example, multiple chemical selection units 826 can be configured to connect and interface with each treatment module 804 where one treatment module 804 can be configured with one chemical selection unit 826.

Figure 9:
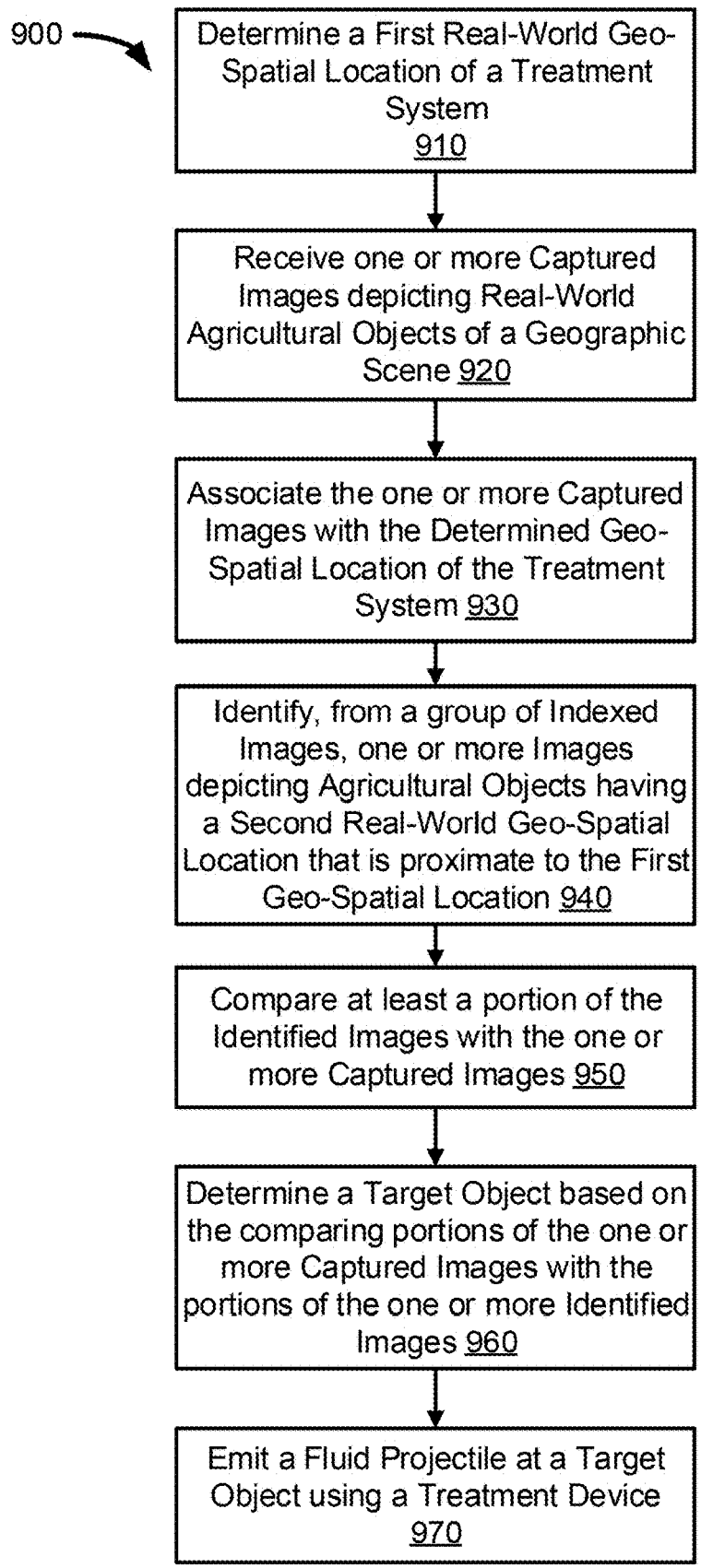
FIG. 9 is block diagram illustrating an exemplary method that may be performed by a treatment system, according to some examples.

FIG. 9 illustrates an example method 900 that may be performed by some example systems described above including system 100, agricultural treatment system 400, system 600, and system 800. For example, at step 910, the agricultural treatment system 400 can determine a first real-world geo-spatial location of the agricultural treatment system 400. At step 920, the agricultural treatment system 400 can receive one or more captured images depicting real-world agricultural objects of a geographic scene. At step 930, the agricultural treatment system 400 can associate the one or more captured images with the determined geo-spatial location of the agricultural treatment system. At step 940, the agricultural treatment system 400 can identify, from a group of indexed images, mapped images, previously assigned images, or representations of agricultural objects including at least in part, image data and position data, or a combination thereof, one or more images having a second real-word geo-spatial location that is proximate with the first real-world geo-spatial location. At step 950, the agricultural treatment system 400 can compare at least a portion of the identified images with the one or more captured images. At step 960, the agricultural treatment system 400 can determine a target object based on the comparing at least a portion of the one or more identified images with at least a portion of the one or more captured images. At step 970, the agricultural treatment system 400 can emit a fluid projectile at a target object in the real-world with a treatment device. The target objects are real-world objects that are intended to be sprayed with the fluid projectile.

The agricultural treatment system 400 may store the group of images in an onboard data storage unit or a remote storage unit. The group of images may include key frame images and sub-key frame images. The key frame images may depict agriculture objects of the geographical scene, and the sub-key frame images may depict a portion of a key frame image, for example a portion of a key frame image can be an image of an agricultural object or cluster of agricultural objects. The key frame images may be images that were previously obtained by image sensors of the system 400. The captured digital images may be obtained by the same cameras of the system 400 at a time subsequent to when the key frame images were taken. For example, in one trial run, the agricultural treatment system, or similar systems 100, 600, and 800, can perform observations of a geographic boundary including detecting and indexing any and all agricultural objects captured by image sensors, and perform one or more precision treatments on detected agricultural objects on the geographic boundary, such as a farm or orchard. The agricultural treatment system 400 can index each image captured by its on-board vision system including one or more image sensors configured to capture images of agricultural objects or crops, or offline at a remote computing location nearby the physical location of the geographic boundary or at different remote location such that the remote computing units can communicate with the agricultural treatment system 400. The indexed series of images captured by image sensors can be further indexed, where one or more of the captured images can be assigned as a keyframe, include a unique keyframe marker. Each keyframe can represent image that include one or more unique agricultural object or landmark of interest in the real world. Because of the navigation unit of agricultural treatment system 400, the keyframes can include location data and a timestamp. For example, the agricultural treatment system 400, in a trial, can capture a series of captured images as the vehicle travels along a path in the geographic boundary. The series of images captured can be images taken of a row of plants including row crops grown directly from the soil or crops growing off trees. One or more images of the series of images captured can include agricultural objects of interest, either for treatment or for observation where the agricultural object can grow into a stage where it is desirable to select a treatment for the agricultural object. The agricultural treatment system 400 can assign the particular image having the individual agricultural object identified as a keyframe. The keyframe, or any other images captured by the agricultural treatment system 400 can include a location based on image analysis performed by the compute unit of the treatment system. For example, a stereo vision system can use epipolar geometry to triangulate a location of an object identified in an image relative to the location of the image capture device.

Additionally, each portion of the image that includes agricultural objects can be labeled and assigned a unique identifier to be indexed in a database. The data indexed can be a 2d or 3d constructed image of an agricultural object having a location and position data attached to the image and a timestamp of when the image was taken. In future trials conducted by the agricultural treatment system 400, the agricultural treatment system 400 may capture images of the same agricultural object at the same or similar location in the geographic boundary. Since the image captured of the agricultural object in the same position was acquired at a future time from the previously captured agricultural object, the agricultural object may have grown to have different features. In one example, the agricultural treatment system can determine that an acquired image of an agricultural object with location and position data, is associated with that of a previously acquired, labeled, assigned, and indexed image or other indexed representation of an agricultural object that is the same agricultural object as the currently detected object. Having associated the two images with location and timestamp data, the agricultural treatment system 400 can determine treatment parameters, including whether to perform a treatment at the given time or trial, determining a mixture, chemical type, volume, concentration, etc., of a treatment, and a precise trajectory for the treatment to be deposited on a surface of the agricultural object. In one example, a user can select in an application the indexed agricultural object, and a user interface of the agricultural treatment object can display information related to the agricultural object including images taken of the agricultural object, including multiple images taken at different locations, and with orientations of the image capture device, for capturing different views of the same agricultural object, as well as multiple images taken at different points in time as the agricultural treatment system 400 conducts multiple trials and captures images of the same or near the same location as previously captured images.

The above example illustrates the agricultural treatment system performing two trials with two sets of images captured at different times, for example a day apart, of the same agricultural object and associating the images of the agricultural object with each other based on image features detected that are common between the images, position, depth, localization, and pose related information from image analysis and computer vision techniques, as well as similar position data captured by the navigation unit of the agricultural treatment system. As more trials are conducted and more images of a same agricultural object are taken, capturing the agricultural object's current growth stage, and associating each captured agricultural object with one or more previously captured images of the same agricultural object, the treatment system 400 can build a unique profile of each unique and individual agricultural object mapped in a geographic boundary, including images associated with each of its growth stages, any and all treatment history to each individual agricultural object. This can allow a user or a treatment system to determine a crop's, health, including diseases, size, count, growth projection, yield projection and estimation of the crop grown on a farm or orchard and allow a user optimize growing crops on a farm by observing and controlling the growth rate of each individual agricultural object detected on a geographic boundary.

In one example, to identify target objects for spraying, the system 400 may compare at least a portion of the identified images by comparing the sub-key frame image to a portion of one of the captured images. In other words, the agricultural treatment system 400 can compare one or more patches or labeled portions of a previously indexed image of an agricultural object with at least a portion of the currently captured image. In this example, a patch is an image cropped out of a bigger image having one or more features of interest. The features of interest in the bigger image captured by image sensors can include agricultural objects, landmarks, scenes or other objects of interest to be identified, labelled, and assigned a unique identifier or marker to be indexed. For example a bounding box of an image, or other shape, can be drawn around a portion of an image, cropped out and separately indexed by the agricultural treatment system 400 and saved as a patch for comparing against captured images taken in the future, for building a digitized map of a geographic boundary, for associating an object captured during one trial with the same object captured at different trials, or a combination thereof. The system 400 determines a confidence level of whether the sub-key frame image matches the portion of the captured image. The system identifies a match where the determined confidence level meets or exceeds a predetermined confidence level threshold value. In one example, various computer vision techniques can be applied to compare and correspond images and determine similar features for matching. This can include template matching for comparing a portion of an image with the region of interest of another image, normalized cross correlation, random sample consensus (RANSAC), scale-invariant feature transform (SIFT), edge orientation histograms, histogram of oriented gradients, gradient location and orientation histogram (GLOH), ridge and edge detection, corner detection, blob detection, optical flow, Lucas-Kanade method, semantic segmentation, correspondence matching, and other computer vision and matching techniques. The system 400 may identify that a captured image includes a target object to be treated or a target object that was already sprayed and does not currently need a treatment based on features detected of the agricultural object, based on its treatment history, or a combination thereof. Based on determining the location of the image sensors of the agricultural treatment system 400, the location of the target object in the obtained image, the system can then configure, orient, and prepare the treatment unit such that a fluid projectile when emitted, would be sprayed in a trajectory to emit fluid onto the real-world targeted agriculture object.

In another example, the system 400 may use landmark features or objects to determine locations of target objects to be sprayed. The landmark objects are real-world objects that aid in determining the location of a target object. The system 400 may identify a landmark object in a captured image and determine a portion of the landmark object in the capture image matches a portion of an image from the group of images. While not intended to be an exhaustive list, examples of landmark object may include a man-made object, a fence, a pole, a structure, a portion of a plant structure, a portion of a tree structure, a leaf formation or a leaf cluster that can be used to mark a specific location of a geographic boundary or distinguish a specific keyframe for having the unique landmark assigned to the portion of the keyframe.

In another example, in one mode of operation, in a first pass along a path along an agricultural environment, the agricultural treatment system 400 obtains a first set of multiple images while the system 400 moves along the path. For example, the agricultural treatment system 400 uses onboard cameras and obtains multiple digital images of agricultural objects (e.g., plants, trees, crops, etc.). While obtaining the multiple images of the agricultural objects, the agricultural treatment system 400 records positional and sensor information and associates this information for each of the obtained images. Some of this information may include geo-spatial location data (e.g., GPS coordinates), temperature data, time of day, humidity data, etc. The agricultural treatment system 400 or an external system (such as a cloud-based service) may further process the obtained images to identify and classify objects found in the images. The processed images may then be stored on a local data storage device of the agricultural treatment system 400.

In a second pass along the agricultural environment, the agricultural treatment system 400 using the onboard cameras obtains a second set of multiple digital images using along the path that had been previously taken along the first pass. For example, the agricultural treatment system 400 may obtain the first set of multiple images on day 1, with the images capturing blossoms on a group of apple trees. The digital images depicting the apple trees may be processed for object classification of the types of blooms depicted in the digital images. The agricultural treatment system 400 may retrieve the processed imagery and associated data identifying the objects and classified types. On day 2, the agricultural treatment system 400 may again follow the original path and obtain new imagery of the apple trees. The agricultural treatment system 400 may then use the second set of obtained images in comparison with the received processed images to identify target agricultural objects to be sprayed, and then spray the agricultural objects. The system 400 then can match the landmark objects to aid the system 400 in determining locations of target objects. In other words, the system 400 may use feature matching of objects in the imagery to determine that a prior image is similar to a captured image.

For example, the processed images received by the treatment 400 system, may have associated positional information. As the agricultural treatment system 400 moves along the path in the second pass, the agricultural treatment system 400 may compare a subset or grouping of the processed images based on location information associated with the processed images, and a then current position or location of the treatment system. The agricultural treatment system 400 compares new images to the processed images and determines whether the images or a portion of the images are similar. The agricultural treatment system 400 may then identify a location to spray based on a likely location of a target object in the processed images.

As noted above, the agricultural treatment system 400 may associate images captured by a camera(s) with real-world physical locations of where images of agricultural objects were obtained. For example, while a vehicle with an agricultural treatment system 400 is moving along a path, an electronic control unit 422 of the agricultural treatment system 400 may generate camera data signals and light data signals with synchronized lighting from the lighting devices of the agricultural treatment system 400 and the capturing of digital images. The ECU 422 may synchronize illumination, by one or more lights mounted on the vehicle, of the physical location of an object(s) for generation of the respective captured image(s) that corresponds with that physical location of the object(s). The object determination and object spraying engine sends the camera data signals and light data signals to ECU 422. The object determination and object spraying engine generates position information that corresponds with a position and an orientation of the vehicle with respect to physical location(s) of the agricultural object(s) and a current route of the moving vehicle. The position information may further be associated with the respective captured image(s) that corresponds with the physical location(s) of the agricultural object(s).

Figure 10:
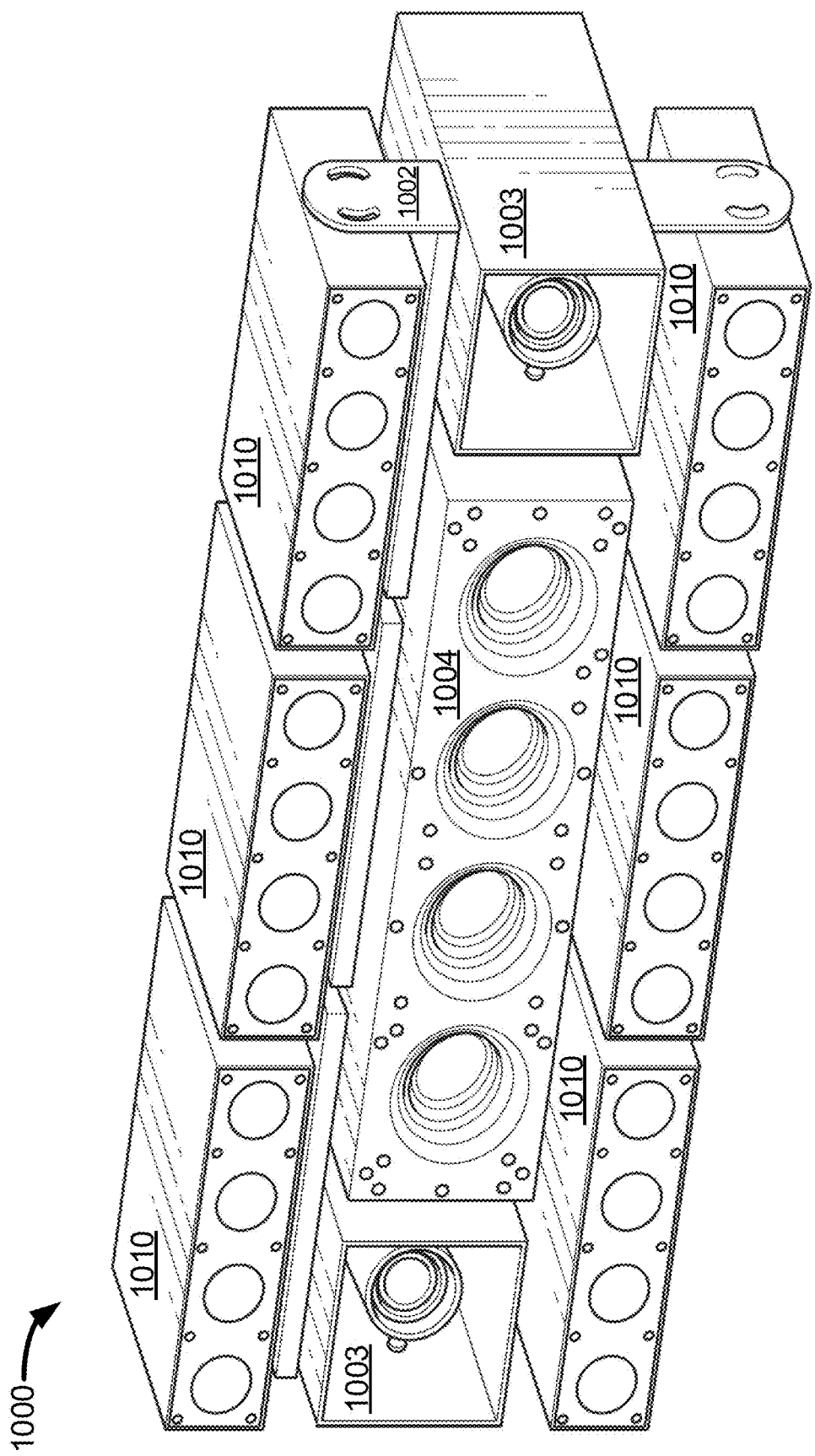
FIG. 10 is a diagram illustrating an exemplary environment, according to some examples.

FIG. 10 illustrates an example modular treatment module, or perch 1000. In one example, the modular perch 1000 may be configured with multiple illumination units 1010 (e.g., illumination modules 460) mounted to a frame 1002, 1003. The perch according to various examples may include multiple illumination units 1010 of LED lights. Illumination unit 1010 may include one or multiple LED lights including an array of LED lights. The perch 1000 may include a camera bank 1004 that includes one or more cameras or other image sensing devices. For example, the inner two cameras may be identification cameras to obtain digital imagery of agricultural objects, and the outer two cameras may be cameras used to obtain imagery of agricultural objects being sprayed. Each LED light may be synchronized to turn on and off with respect to when an identification camera(s) is capturing an image.

Additionally, the housing 1003 can house a treatment unit 1100, similar to that of treatment unit 828. Each treatment unit 1100 may have one or more nozzles for spraying a fluid.

Figure 11:
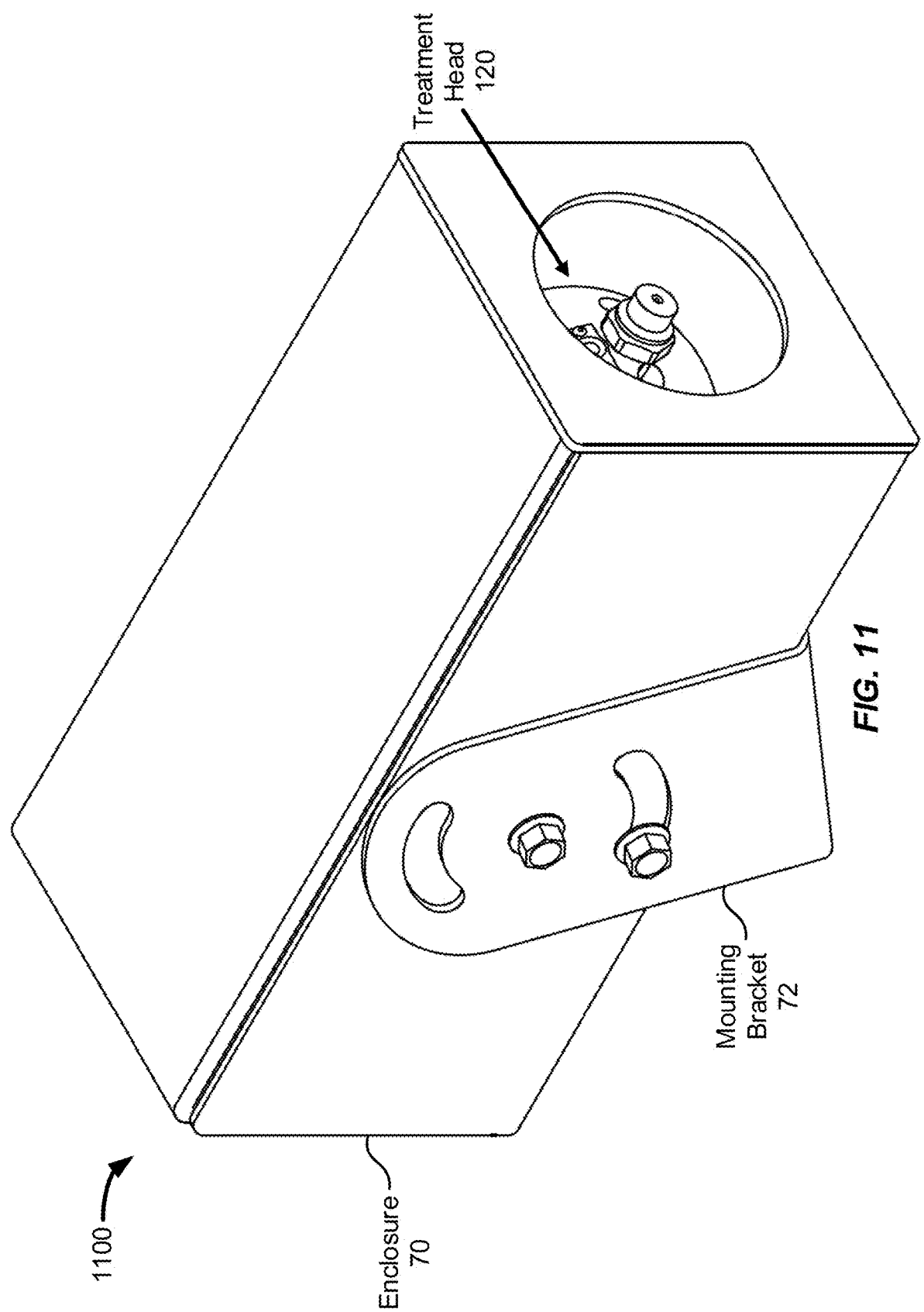
FIG. 11 is a diagram illustrating an example treatment unit, according to some examples.

FIG. 11 illustrates an example agricultural treatment unit, such as treatment unit 1100 of an agricultural treatment system. The agricultural treatment system in this example, can be similar to that of agricultural treatment system 400 with treatment unit 470 similar to that of treatment unit 1100. In this example, the treatment unit 1100 can include a turret assembly with a treatment head 1120, and circuitry, electronic components and computing devices, such as one or more microcontrollers, electronic control units, FPGA, ASIC, system on chip, or other computing devices, configured to receive instructions to point and orient the treatment head 1120, to treat a surface of a real world object in proximity of the treatment unit 1100. For example, the treatment unit 1100 can emit a fluid projectile of a treatment chemical onto an agricultural object in the real world based on detecting the agricultural object in an image captured and determining its location in the real world relative to the treatment unit 1100.

The treatment unit 1100 can include a gimbal assembly, such that the treatment head 1120 can be embedded in, or supported by the gimbal assembly, effectively allowing the treatment head 1120 to rotate itself and orient itself about one or more rotational axes. For example, the gimbal assembly can have a first gimbal axis, and a second gimbal axis, the first gimbal axis allowing the gimbal to rotate about a yaw axis, and the second gimbal axis allowing the gimbal to rotate about a pitch axis. In one example, the gimbal assembly can have a third gimbal axis to allow roll of the treatment unit, giving the treatment head 120 of the treatment unit 1100 a total of 3 degrees of freedom relative to the treatment unit 1100. In this example, a control module of the treatment unit can control the gimbal assembly which changes the rotation of the gimbal assembly about its first gimbal axis, second gimbal axis, or both. A computing module can determine a location on the ground scene, terrain, or tree in an orchard, or other agricultural environment, and instruct the control module of the treatment unit 1100 to rotate and orient the gimbal assembly of the treatment unit 1100. In one example, the computing module can determine a position and orientation for the gimbal assembly to position and orient the treatment head 1120 in real time and make adjustments in the position and orientation of the treatment head 1120 as the treatment unit 1100 is moving relative to any target plants or agricultural objects of interest on the ground either in a fixed position on the ground, or is also moving. The treatment system can lock the treatment unit 1100, at the treatment head 1120, onto the target plant, or other agricultural object of interest through instructions received and controls performed by the control module of the treatment unit 1100, to adjust the gimbal assembly to move, or keep and adjust, in real time, the line of sight of the treatment head 1120 onto the target plant.

In one example, the treatment unit 1100 can include protective components such as an enclosure 70 to shield the treatment unit 1100 from dust, water, moisture, sunlight, and other particles that can damage components of the treatment unit 1100, as well as protect the treatment head 1120 from wind or other forces that could disturb the desired orientation of the treatment head 1120. The treatment unit 1100 can also include one or more mounting brackets 72 to mount the enclosure 70 supporting the treatment unit 1100 to other components of the treatment system or a vehicle supporting the treatment system.

In one example, one or more brushless motors can be configured to change one axes of the treatment head of the treatment unit. A solenoid valve can be configured to open or close the valve where constant pressurized fluid from the pump is pumping fluid into the solenoid valve. The treatment unit can emit a projectile by an amount and time the valve is moved from a closed position to an opened position.

In one example, the treatment unit 1100, having a high-powered laser unit or laser chip embedded in or supported by the treatment unit 1100, can be configured to treat portions of plants that are larger than plant typically only grow a few inches or feet above the ground. These plants can include trees, orchard trees, or other plants with one or more trunks, shrubs, bushes, or other plants grown on trellises or other human made mechanisms such that a horizontally or top mounted treatment unit 1100 is more practical rather than a treatment unit substantially pointing at the ground with rotational freedom.

Figure 12A:
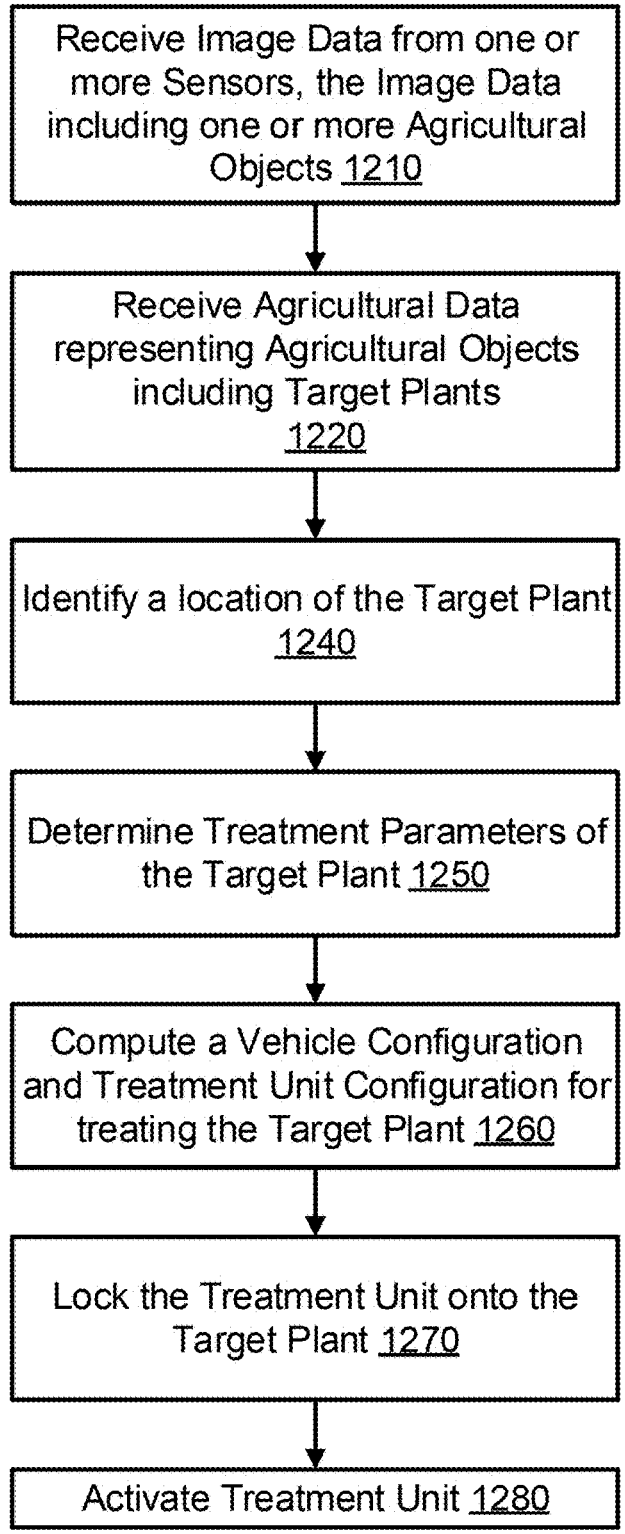
FIG. 12A is block diagram illustrating an exemplary method that may be performed by a treatment system, according to some examples.
Figure 12B:
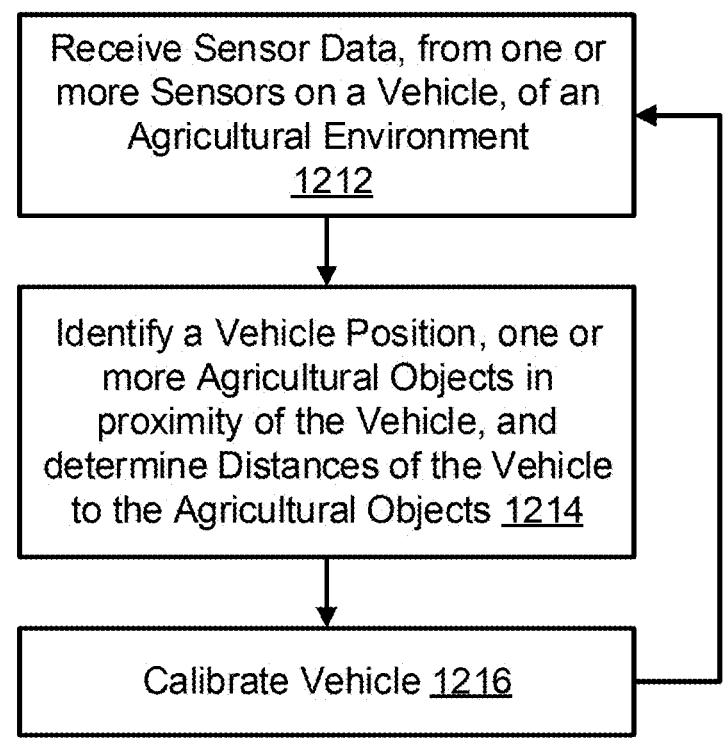
FIG. 12B is block diagram illustrating an exemplary method that may be performed by a treatment system, according to some examples.

FIGS. 12A-12B illustrate example implementations of method 1200 that may be performed by some example systems described above including system 100, agricultural treatment system 400, system 600, and system 800. For example, in one mode of operation, at step 1210, the agricultural treatment system 400 can receive image data from one or more sensors, the image data including one or more agricultural objects. The one or more agricultural objects can be identified as one or more target plants from the image data. At step 1220, the agricultural treatment system 400 can receive agricultural data representing agricultural objects including different crops and target plants. At step 1240, the agricultural treatment system 400 can identify a location of the target plant. At step 1250, the agricultural treatment system 400 can determine treatment parameters of the target plant. At step 1260, the agricultural treatment system 400 can compute a vehicle configuration and treatment unit configuration for treating the target plant. At step 1270, the agricultural treatment system 400 can lock the treatment unit onto the target plant in the real world. At step 1280, the agricultural treatment system 400 can activate the treatment unit and emits a fluid projectile of a treatment chemical onto the target plant.

Additionally, the agricultural treatment system 400 can receive, fuse, compute, compensate, and determine positional, localization, and pose related signals on a geographic boundary. At step 1212, the agricultural treatment system 400 can receive sensor data, from one or more sensors on a vehicle of an agricultural environment. The agricultural environment can be that of a geographic boundary having a plurality of objects typically found on a farm or orchard for cultivating land and growing and harvesting crops. At step 1214, the agricultural treatment system can identify a vehicle position, one or more agricultural objects in proximity of the vehicle, and determine distances of the vehicle to the agricultural objects. At step 1216, the agricultural treatment system 400 can calibrate the vehicle, including calculating a pose estimation of the vehicle relative to a central or known point in the geographic boundary, pose estimation of components of the agricultural treatment system 400 relative to the vehicle supporting the agricultural treatment system, or agricultural objects detected in space relative to the vehicle. The vehicle can be calibrated by locating one or more calibration targets spread throughout a mapped geographic boundary such that as the agricultural treatment system 400 identifies a physical calibration target and calculates its position relative to the calibration target, the agricultural treatment system 400 can determine, or correct a previous inaccurate determination, a position of the vehicle in the geographic boundary.

Figure 13A:
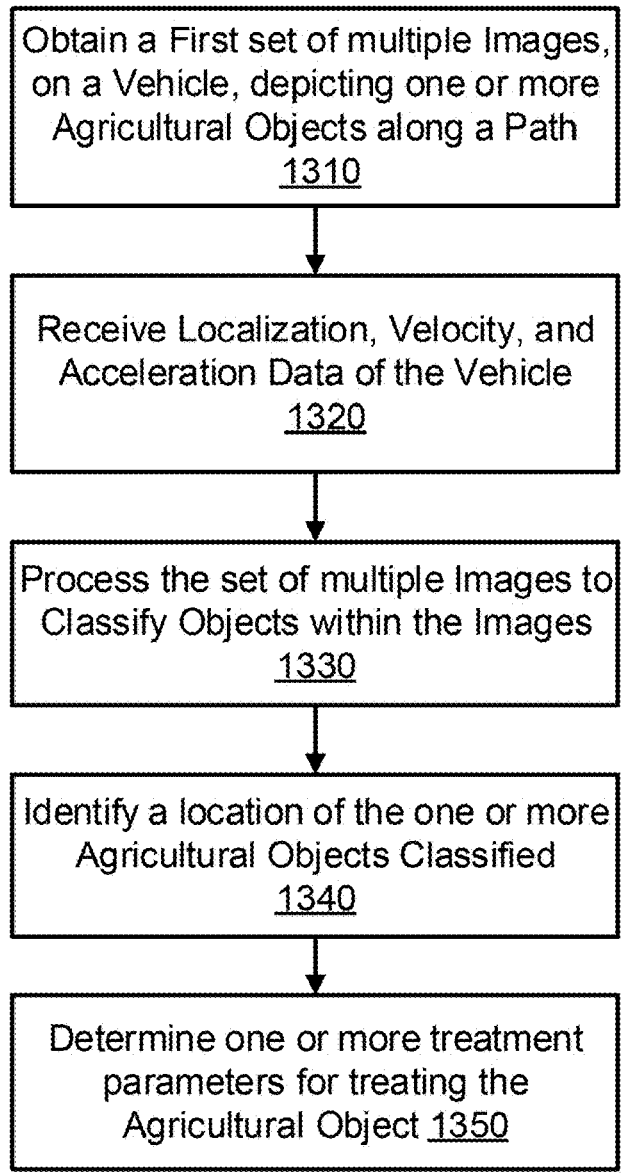
FIG. 13A is block diagram illustrating an exemplary method that may be performed by an agricultural observation and treatment system, according to some examples.
Figure 13B:
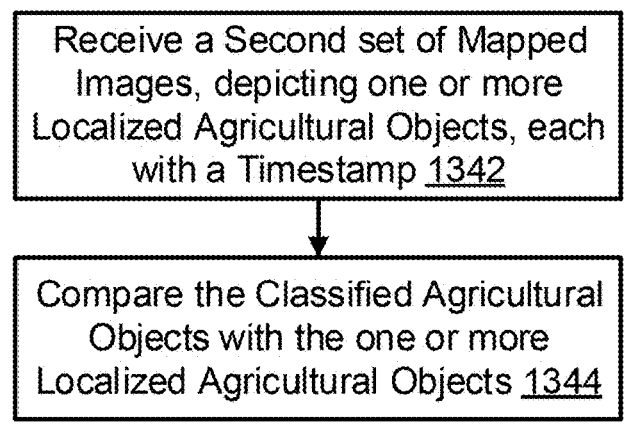
FIG. 13B is block diagram illustrating an exemplary method that may be performed in conjunction with the method of illustrated in FIG. 13A, according to some examples.

FIGS. 13A-13B illustrate example implementations of method 1300 that may be performed by some example systems described above including system 100, agricultural treatment system 400, system 600, and system 800. For example, in one mode of operation, at step 1310, the agricultural treatment system 400 can obtain a first set of multiple images, on a vehicle, depicting one or more agricultural objects along a path. At step 1320, the agricultural treatment system 400 can receive localization, velocity, and acceleration data of the vehicle. Additionally, at step 1380, the agricultural treatment system 400 can generate a pose estimation of the vehicle in a geographic boundary, the agricultural treatment system 400 supported by the vehicle relative to the vehicle, or agricultural objects or other objects detected in the geographic boundary. At step 1330, the agricultural treatment system 400 can process the set of multiple images to classify objects within the image. The classification can be performed on board the vehicle at the agricultural treatment system 400. Additionally, the image can be processed with computer vision techniques, image analysis, and machine learning algorithms including deep neural networks for performing feature extraction, object classification, object detection, and object tracking. At step 1340, the agricultural treatment system 400 can identify a location of the one or more agricultural objects classified. At step 1350, the agricultural treatment system 400 can determine one or more treatment parameters for treating the agricultural object.

Additionally, the agricultural treatment system 400 can detect, target, track, and determine treatment parameters based on previously identified and indexed information of one or more images, including one or more images with the same agricultural object identified and classified in the first set of multiple images. For example, at step 1342, the agricultural treatment system 400 can receive a second set of mapped images, depicting one or more localized agricultural objects, each with a timestamp associated with the image captured of each mapped image and treatment history associated with each of the localized agricultural objects. At step 1344, the agricultural treatment system 400 can compare and correspond the classified agricultural objects with the one or more localized agricultural objects. The agricultural treatment system 400 can then activate a treatment unit and emit a fluid projectile onto the target plant that is the agricultural object.

Figure 14A:
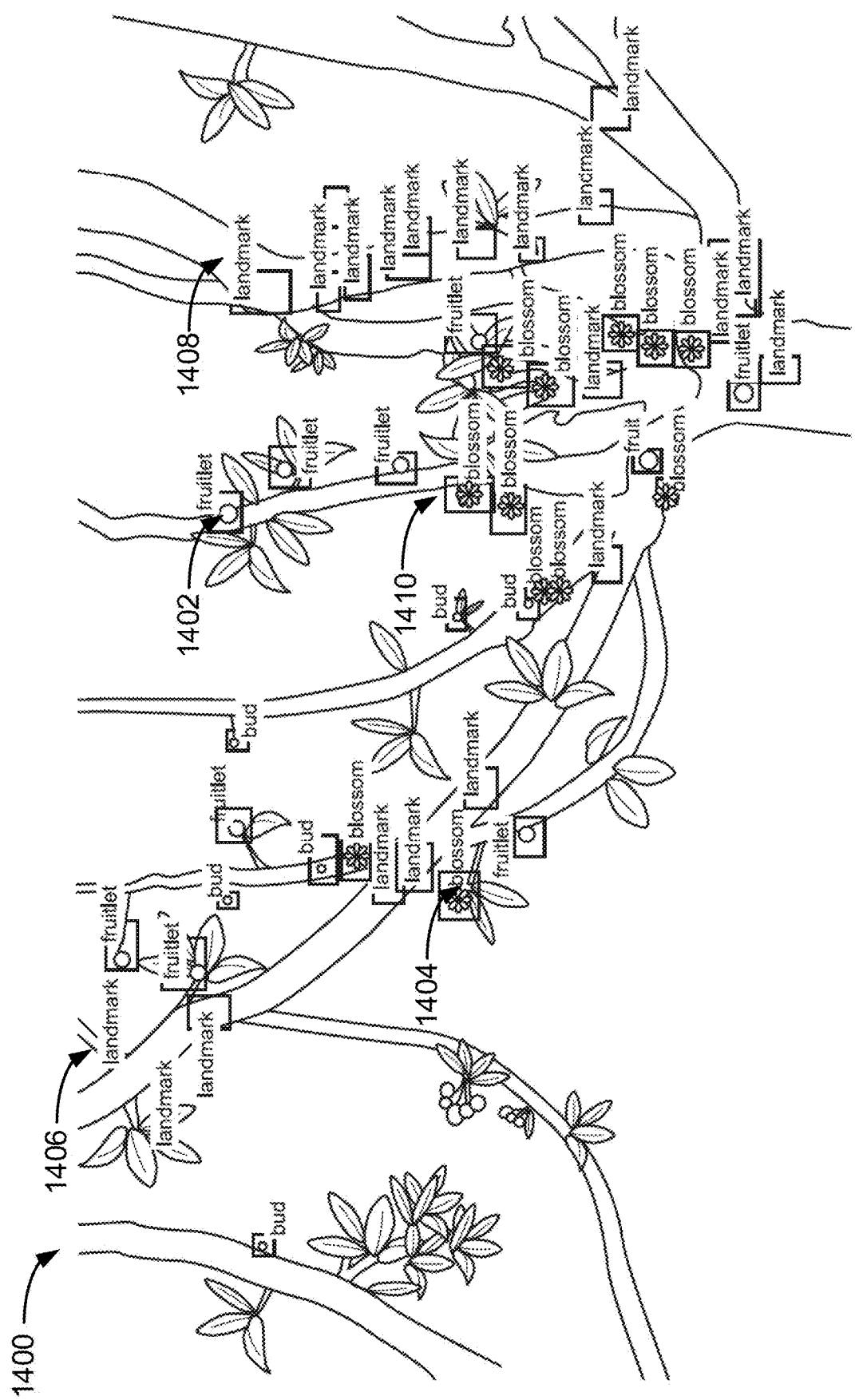
FIG. 14A is a diagram illustrating an exemplary labeled image, according to some examples.
Figure 14B:
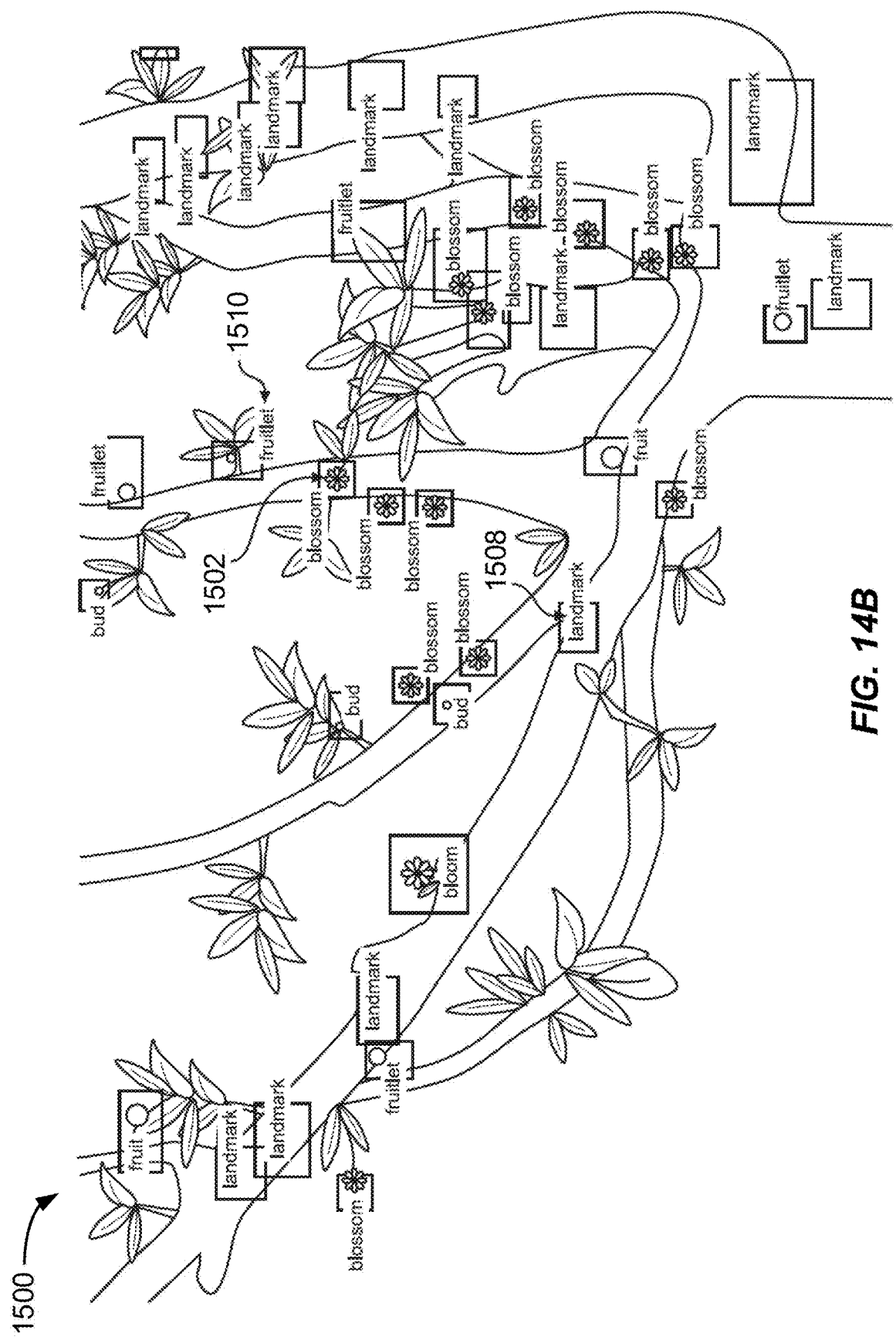
FIG. 14B is a diagram illustrating an exemplary labeled image, according to some examples.

FIGS. 14A-14B illustrate example images obtained by the agricultural treatment system 400 and having been processed to determine and label objects in the obtained image.

As shown in the diagram 1400 if FIG. 14A, a labeled image received by the agricultural treatment system 400 may include multiple identifiers of different types of objects 1402, 1404, 1406 portrayed in a captured image. For example, an identifier 1405 may identify a portion of the captured image that portrays a physical landmark of an of an agricultural object. The identifier 1406 may further be based on visual characteristics of the object.

FIG. 14B illustrates an example portion or sub-image of an image obtained by the agricultural treatment system 400. Based on visual characteristics of an instance of an apple blossom portrayed by the captured image of an apple tree, the labeled image may include an identifier 1502 for the apple blossom instance. The identifier 1502 may be positioned in the labeled image 1500 at a first pixel position that corresponds to the apple blossom instance's physical location as it is portrayed in the captured image of the apple tree. Based on visual characteristics of an instance of an apple fruitlet portrayed by the captured image of the apple tree, the labeled image 1500 may include an identifier 1510 for the apple fruitlet instance. The identifier 1510 may be positioned in the labeled image 1500 at a second pixel position that corresponds to the apple fruitlet instance's physical location as it is portrayed in the captured image of the apple tree. Based on visual characteristics of an instance of a landmark portrayed by the captured image of the apple tree, the labeled image 1500 may include an identifier 1508 for the landmark instance. The identifier 1508 may be positioned in the labeled image 1500 at a third pixel position that corresponds to the landmark instance's physical location as it is portrayed in the captured image of the apple tree.

In one example, the object determination and object spraying engine generates positional data for an instance of the fruit at a particular stage of growth that is portrayed in a captured image based in part on: (i) a pixel position of the portrayal of the instance of a fruit at the particular stage of growth in the labeled image (and/or the captured image), (ii) the position information of the moving vehicle, and/or (iii) previously generated position information associated with a previous captured image(s) of the instance of the fruit and the physical location of the instance of the fruit. Previously generated position information may be associated with captured and labeled images that portray the same instance of the fruit when the vehicle traveled a similar route during a previous time, such as a prior hour of the day, prior day, week and/or month. The agricultural treatment system 400 may generates nozzle signals for the synchronization ECU of the agricultural treatment system 400 on a vehicle based on the positional data for the instance of the fruit at the particular stage of growth. For example, the nozzle signals may indicate a physical orientation of the nozzle to create a trajectory for a liquid. The nozzle signals may represent a change in a current orientation of the nozzle based one or more axial adjustments of the nozzle.

The object determination and object spraying engine sends the projectile from the nozzle towards the physical location of the object according to the trajectory. For example, the object determination and object spraying engine adjusts a current orientation of the nozzle according to the nozzle signals and triggers the nozzle to spray a liquid towards the physical location of the instance of the fruit.

Because not all plants need the same amount, for example by type, volume, frequency, or a combination thereof, of treatment based on the stage of growth of the particular plant, the agricultural treatment system 400 can be configured to scan a row of crops to identify the stage of growth of each individual crop or agricultural object that is a plant or portion of a plant and determine whether the identified crop or agricultural object needs a treatment on the particular trial run, or day, or at the particular moment in time the vehicle with agricultural treatment system 400 is on the field and has detected the individual agricultural object. For example, a row of crops, even of the same kind of plant, can have a plurality of agricultural objects and sub-agricultural objects of the agricultural objects, where the agricultural object may depict different physical attributes such as shapes, size, color, density, etc.

For example, a plant for growing a particular type of fruit, in one agricultural cycle, can produce one or more individual crop units, for example a fruit tree, each taking the shape of a first type of bud, second type of bud, and so forth, a flower, a blossom, a fruitlet, and eventually a fruit, depending on a growth stage of a particular crop. In this example, the agricultural treatment system 400 can label each stage of the same identified object or crop, down to the particular individual bud, on the fruit tree as different agricultural objects or sub agricultural objects, as the object changes in its growth stage including its particular shape, size, color, density, and other factors that indicate a growth into a crop. The different agricultural objects detected and labelled associated with the same object in the real-world space can be associated with each other For example, a bud detected can be labelled as a unique agricultural object with a unique identifier or label. As time moves forward in a season, the uniquely labelled bud that is mapped on a farm may change shape into a flower for pollination, or from a flower to a fruitlet, and so forth. As this happens, the agricultural treatment system 400 can identify the flower and label the flower as a unique agricultural object and associate the agricultural object that is the flower with the agricultural object that is the bud previously identified and logically link the two identified agricultural objects as the same object in the real world where one object identified has grown into the other. In another example, the unique real-world flower detected, of a plurality of flowers and other objects in a geographic boundary, can be labelled as a flower but not considered a different agricultural object, and instead be associated with the same agricultural objected previously labeled as a bud. In this example, each object detected that can be considered a potential crop can be mapped as the same agricultural object, even though the agricultural object will change shape, size, density, anatomy, etc. The same agricultural object detected in the same space at different times can then have different labels and identifiers as related to the stage of growth. For example, a first agricultural object in space, detected by the agricultural treatment system 400, can be identified and indexed as a real-world agricultural object #40 with a timestamp associated with the time of day and year that the agricultural treatment system 400 captured one or more images or other sensing signals of agricultural object #40. At the moment in time of identification, the agricultural object #40 can have a first label and assign the first label to agricultural object #40. The first label can be labelled as a bud, or bud #40 since there may be many other buds detected in the geographic boundary such as a farm or orchard. As multiple trials across a span of time are conducted in the geographic boundary on the same agricultural object #40, the agricultural object #40 can turn from a first type of bud, such as a dormant bud, into a second type of bud, or from a bud and bloom into a flower, or many other changes in stages of growth of desired agricultural plants grown for harvest and consumption. In this example, the agricultural object #40 detected as a bud at a given moment in time can be labeled as agricultural object

40 as a first label of bud #40. As time moves forward in a season, the agricultural objects on the farm or orchard, including agricultural object #40 as bud #40 can naturally turn into a flower. At this moment, if and when the agricultural object #40 turns into a flower, the agricultural treatment system 400 can label the agricultural object #40 as a flower #40, associating the bud #40 with flower #40 such that the bud #40 and flower #40 are the same agricultural object #40 in the real world. Not all agricultural objects detected of the same plant may experience the same stages of growth or continue to keep growing. Some agricultural objects may even be removed, for example by thinning. For example, some plants can be thinned such that one or more agricultural objects growing from a single tree or stem can be removed or treated such that the next growth stage will not happen. In this instance, the agricultural treatment system 400 can still detect that a uniquely identified real world agricultural object did not reach, or stopped, at a certain growth stage having unique physical features for a unique object label, or that the agricultural object detected previously is now gone and cannot be detected by the agricultural treatment system 400 due to thinning or other method of removing the agricultural object so that neighboring agricultural objects can continue to grow as desired.

The description of buds, blooms, flowers, fruitlets, and other agricultural objects and stages of growth of such agricultural objects discussed are only meant to be an example series of objects that can be detected by a treatment system, such as agricultural treatment system 400 detecting fruits and objects associated with the stages of growth of fruits on fruit trees, and not meant to be limiting only to the specific example described above.

For example, as illustrated in FIGS. 14A and 14B, an image depicting an agricultural environment including a fruit tree having one or more spurs, one or more branches and stems, one or more laterals, and one or more potential crops growing on the one or more laterals. At the moment the agricultural treatment system 400 has observed and labelled each identifiable feature of the image, including detecting agricultural objects and labelling its growth stage, detecting and labelling landmarks including orientations of portions of the tree growing including configurations of leaves, branches, physical manmade materials that can be detected in the image, or other objects and sights of interest in the image that is not a potential crop, the agricultural treatment system 400 can detect that not all identified objects in the image include agricultural objects of the same growth stage. For example, some agricultural objects detected are labelled as buds, some as blossoms, and some as fruitlets. Each of these labels are of agricultural objects of interest to observe and potentially treat, but not necessarily treated the same way depending on the growth stage. The agricultural treatment system 400 can then determine treatment parameters in real time to treat each individually labelled agricultural object with different treatment parameters, or refrain from treating an agricultural object. For example, if a first labelled growth stage does not need to be treated, a second growth stage does need to be treated at least once, a third growth stage does not need to be treated, the agricultural treatment system 400 can scan through a path, capture images such as the one depicted in image 1400, and treat only the second labelled growth stage. In this specific example, a blossom can be treated with artificial pollen. The agricultural treatment system 400 can detect that there are buds that have not yet blossomed, and fruitlets that have already grown after the blossom, so the agricultural treatment system 400 will refrain from treating the agricultural object 1402 and only treat agricultural objects labelled with the same label as that of agricultural object 1410. In one example, the agricultural treatment system 400 can select different treatment mixtures and emit different treatment projectiles by volume, concentration, mixture type, as well as the type of emission which can be a single spray projectile, a spray projectile with a large surface area travelling towards the surface of the agricultural object, or a mist or fog type spray treatment. In this example, multiple identified agricultural objects at different growth stages can require a treatment with different parameters. Instead of refraining from treating one type of agricultural object at a certain growth stage while treating other agricultural objects having the desired growth stage for a particular trial, the agricultural treatment system 400 can treat multiple types of growth stages of agricultural objects growing on the same tree simultaneously by selecting and receiving a desired chemical mixture for treatment in real time.

The agricultural treatment system 400 can observe, by running a plurality of trials, such that one trial is a sequence of capturing sensor data, depositing treatments, or a combination thereof, along each row of crops on a farm or orchard one time and captures sensor data and has the opportunity to deposit a treatment for each crop or agricultural object detected. For example, a trial run, where the agricultural treatment system 400 scans through a farm of one or more row crops in one cycle, can be performed once a day, or twice a day, once during daytime and once during night time in a calendar day. For example, the agricultural treatment system 400 can perform multiple trials or runs on a farm or orchard in a single day, particularly if the growth sequence of a plant is more rapid in one season or series of days over another season, such that the agricultural treatment system 400 can capture more changes in stages of growth by conducting more trials as well as depositing treatments onto surfaces of desired agricultural objects more frequently.

Additionally, each row of crops, whether each row includes the same plant or of different plant types, for example planted in an alternating patter, can include a plurality of plants that have one or more buds exposed, a plurality of plants that have one or more blossoms exposed, a plurality of plants that have one or more fruitlets exposed for treatment, or a combination of plants having a combination of buds, blossoms, fruitlets, etc., exposed at the same time on a single row. In this example, different agricultural objects at different stages will require different treatments at different volumes and frequencies. The agricultural treatment system 400 can identify the particular stage of growth of each uniquely identified agricultural object mapped in the row of plurality of agricultural objects and give a label or identifier to each agricultural object based on its different and unique growth stage. The agricultural treatment system 400 can then identify the appropriate or desired treatment parameters including treatment chemical mixture, density and concentration, whether a treatment is needed at all for the particular trial if the agricultural treatment system 400 can identify that a particular agricultural object was already previously treated with a treatment deposition such that another treatment at a given trial can be too close in time for the same treatment to be applied again to the same unique agricultural object in the geographic boundary, depending on the stage of growth detected.

The agricultural treatment system 400 can detect a first agricultural object of a plurality of agricultural objects in a row of plants inside a geographic boundary such as a farm or orchard. The agricultural treatment system 400 can determine that the first agricultural object is different from a plurality of other agricultural objects by type or that the first agricultural object detected is among a plurality of the same type of agricultural objects as that of the first and can be indexed by a unique identifier to identify the particular object in the real world so that each unit or object in the real world of the same agricultural object type can be indexed and located in the geographic boundary. For example, a first agricultural object of a plurality of agricultural objects of the same plant type of the same tree or root can be identified on an orchard or row farm. The first agricultural object can be assigned and indexed as agricultural object #400 with a unique identifier that identifies its object type, such as a type of crop, and its location in the geographic boundary and time that the identifier was assigned to the first agricultural object. The agricultural treatment system 400 can also assign a label of the first agricultural object based on the size, shape, color, texture, etc., with a first label, for example fruitlet #400 if the detected first object is a fruitlet of a crop. Because different stages of growth of a same desired plant or crop can require a different type, frequency, volume, or a combination thereof of treatment, the agricultural treatment system 400 can determine treatment parameters, in real time upon detecting the first agricultural object in space and the growth stage of the first agricultural object either determined in real time or determined based on the growth stage detected on a previous trial. For example, if the first agricultural object detected at a particular time is a flower or cluster of flowers, the agricultural treatment system 400 can label the flower detected in one or more images as a flower and determine treatment parameters for the flower. The agricultural treatment system 400 can apply the same type, mixture, amount, and frequency of a treatment to the each of the same agricultural object type detected at the same growth stage along the same row of plants. The agricultural treatment system 400 can apply a different type, mixture, amount, and frequency of a treatment to each of the same agricultural object type detected at a different growth stage along the same row of plants. In one example, the different growth stage of the plant or portion of a plant can vary by days or hours in one part of a season and vary by weeks or months in another part of a season. For example, a tree of a plurality of trees in a row of the same type of plant yielding the same crop can have portions of the tree, for example shoots, spurs, stems, laterals, or branches with nodes, clusters, buds, or other objects for crops, growing at different stages. A bud for a potential crop can form on one portion of the tree or lateral while other portions of the tree do not have buds. At this stage, the agricultural treatment system 400 can identify the portions of the tree that do have buds and perform any treatment including chemical treatment or light treatment (e.g. laser) that is appropriate for treating a bud of a certain plant. In another example, a tree can have some laterals that have blossoms and some laterals that only have buds. In this example, the blossoms may be treated with a certain treatment and the buds may be treated with a different type of treatment as that of the treatment for blossoms. The agricultural treatment system 400 can identify and distinguish between the various agricultural objects in space having different labels based on their growth stage and apply a treatment appropriate for each unique agricultural object identified and located in the real world.

The agricultural treatment system 400 can also identify and index a treatment history on each unique agricultural object identified in space of a geographic boundary. For example, one or more buds detected on laterals of a tree can be treated with a certain type of chemical or light treatment. At this point in time, certain laterals will have laterals that have yet to form buds. As time moves forward and the agricultural treatment system 400 engages the row of crops for treatment, the laterals that have yet to form buds may now have buds. Additionally, the previously detected buds, that have been treated have not yet turned onto a flower, or even further stage of a bud that may require an additional treatment or different type of treatment. In this example, because the agricultural treatment system 400 has indexed each agricultural object detected by its growth stage, with a label across time, and timestamp for each time the agricultural object was detected and its specific growth stage and image of the growth stage labeled, the agricultural treatment system 400 can determine which agricultural objects in the row requires treatment and which agricultural objects in the row does not require a treatment, either because it was already treated in a previous trial and does not need a treatment every trial, or has not reached a later growth stage detected that will require a different type, frequency, mixture, etc., of treatment.

As with the earlier example, the first real-world agricultural object #400, having one or more images, a location, and object type associated with object #400, based on its labelled stage of growth, for example label #400, can require a first treatment having a specific treatment mixture, type, volume, concentration, etc., and projectile emission strength. A second agricultural object #401, in proximity to agricultural object #400, for example, being a potential object for harvest of the same tree as that of agricultural object #400, having one or more images, a location, and object type associate with the agricultural object #401, based on its label #401, can require a second treatment having a specific treatment mixture, type, volume, concentration, etc., and projectile emission strength. The difference in treatment parameters such as the mixture, type, volume, concentration, strength of the projectile emitted, or a combination thereof, or abstaining from depositing a treatment at all for the particular trial run conducted by the agricultural treatment system 400, can be based on the different growth stage detected, even if the agricultural object is of the same type. In one example, different treatment parameters can be applied to a row of crops with the same type of plant but portions of the plant, such as various laterals can have agricultural objects growing on the laterals at different stages and require different treatments. Different treatment parameters can be applied to a row of crops with different plants in the row, for example with alternating crops. In one example, the same treatments with the same treatment parameters can be applied to the same row of crops of each agricultural object having the same or similar stage of growth. In one example, a different concentration or frequencies of treatments deposited can be applied to a row of crops of either the same plant of different plants at different stages of growth. For example, a first bloom of a lateral can require one deposition of chemical-#1 with a certain mixture, concentration, volume, etc. Other portions of the tree or other laterals may not have yet experienced a bloom from the buds so only the first bloom will receive a treatment of chemical-#1. At a later time, and more specifically, at later trial performed by the agricultural treatment system 400, other laterals will experience a bloom, such as a second bloom. In one example, it would be desirable for the second bloom to receive a single treatment of chemical-#1. Since the first bloom already received a treatment of chemical-#1 and for this particular example growth stage of this particular plant type, this example first bloom only requires one treatment of chemical-#1, the agricultural treatment system 400 can detect that the agricultural object of the second bloom requires a treatment of chemical-#1 of a specified volume, concentration, strength of projectile and apply the treatment of chemical-#1, and detect that the agricultural object of the first bloom does not need a treatment at all for this trial.

Figure 15:
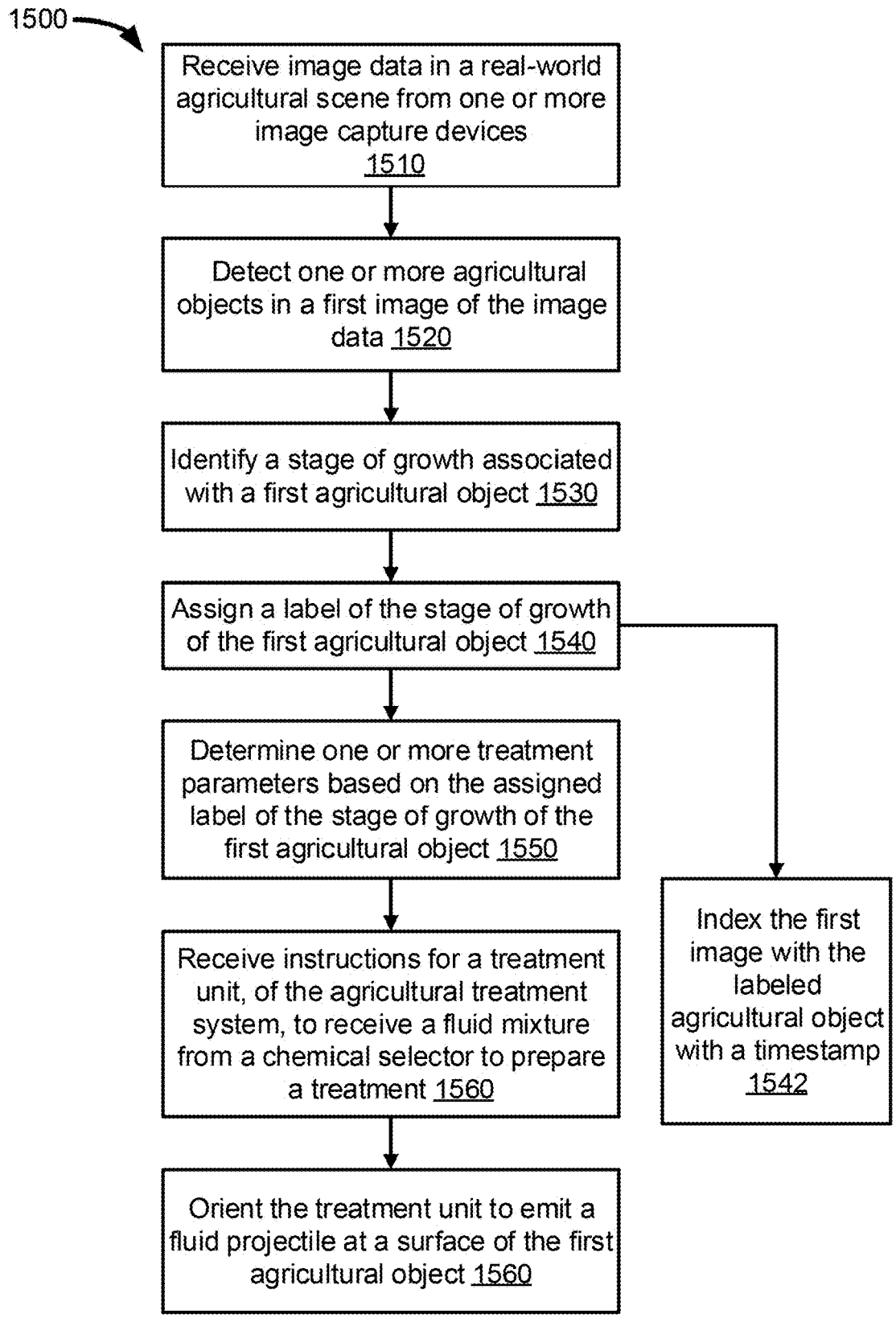
FIG. 15 is block diagram illustrating an exemplary method that may be performed by an agricultural observation and treatment system, according to some examples.

FIG. 15 illustrates an example method 1200 that may be performed by some example systems described above including system 100, agricultural treatment system 400, system 600, and system 800. For example, in one mode of operation, at step 1510, the agricultural treatment system 400 can receive image data in a real-world agricultural scene from one or more image capture devices. At step 1520, the agricultural treatment system 400 can detect one or more agricultural objects in a first image of the image data. At step 1530, the agricultural treatment system 400 can identify a stage of growth associated with a first agricultural object. At step 1540, agricultural treatment system 400 can assign a label of the stage of growth of the first agricultural object. Additionally, at step 1542, the agricultural treatment system 400 can index and store the first image with the labelled agricultural object with a timestamp of the first image taken associated with the label. At step 1550, the agricultural treatment system 400 can determine one or more treatment parameters based on the assigned label of the stage of growth of the first agricultural object. At step 1560, the agricultural treatment system 400 can receive instructions for a treatment unit, of the agricultural treatment system, to receive a fluid mixture from a chemical selector to prepare a treatment. At step 1570, the agricultural treatment system 400 can orient the treatment unit to target the first agricultural object in the real-world agricultural scene and activate the treatment unit to emit a fluid projectile at a surface of the first agricultural object.

In one example, the agricultural treatment system 400 can determine that different chemical concentrations of a chemical mixture are required for different growth stages of the same plant on a row of plants. In one example, the agricultural treatment system 400 can determine that different chemical concentrations of a chemical mixture are required for different growth stages of different plants planted on a same row on a farm or orchard. In another example, the agricultural treatment system 400 can determine that only certain growth stages of agricultural objects detect require a deposition of a particular treatment, and that other agricultural objects detected require a deposition of a different treatment, or no treatment, depending on the stage of growth and treatment history of the particular agricultural objected detected in the real world. In one example, a row of plants can have laterals supporting different agricultural objects, or the same agricultural objects with different stages of growth and different treatment histories, such that different treatments are desired for each unique agricultural object in the row. The chemical selection unit can mix different treatment mixtures and concentrations in real time for the agricultural treatment system 400 to accommodate the different requirements of treatments in real time while performing a trial in a particular row of plants. Additionally, the agricultural treatment system 400 can accommodate for applying different treatments to different agricultural objects of different plants in a single row, or other configuration, of crops.

Thus, the agricultural treatment system 400 can, in real time, scan with sensors for agricultural objects and its stage of growth and real-world location in the row, determine whether to apply a particular treatment based on stage of growth detected and the particular agricultural object's treatment history.

FIGS. 16-24 illustrate various examples of performing agricultural observation, digitizing a geographic boundary, building a map of each individual agricultural object or crop detected and associating captured images of agricultural objects from one moment in time to another to digitize and map a farm with location and image history of each agricultural object detected, and treating each individual agricultural object detected.

The description of buds, blooms, flowers, fruitlets, and other agricultural objects and stages of growth of such agricultural objects discussed are only meant to be an example series of objects that can be detected by a treatment system, such as agricultural treatment system 400 detecting fruits and objects associated with the stages of growth of fruits on fruit trees, and not meant to be limiting only to the specific example described above. For example, agricultural objects can include larger objects or portions of a tree that are part of supporting a crop can be detected, classified, and labelled for spraying including spurs, shoots, stems, laterals, other nodes, fruiting clusters, leaves, or other portions of a tree. Different types of plants can be treated by the treatment system including general plants for crops, specialty crops, including fruits, vegetables, nuts, flowers, herbs, foliage, etc. The agricultural treatment system 400 can be performed in geographic boundaries typically appropriate for a robotic vision and treatment deposition system for observing, treating, harvesting, or a combination thereof, of crops such as farms, orchards, greenhouses, nurseries, or other regionally and topographically bounded locations for agronomy and agriculture, horticulture, floriculture, hydroculture, hydroponics, aquaponics, aeroponics, soil science and soil agronomy, pedology, etc.

Figure 16:
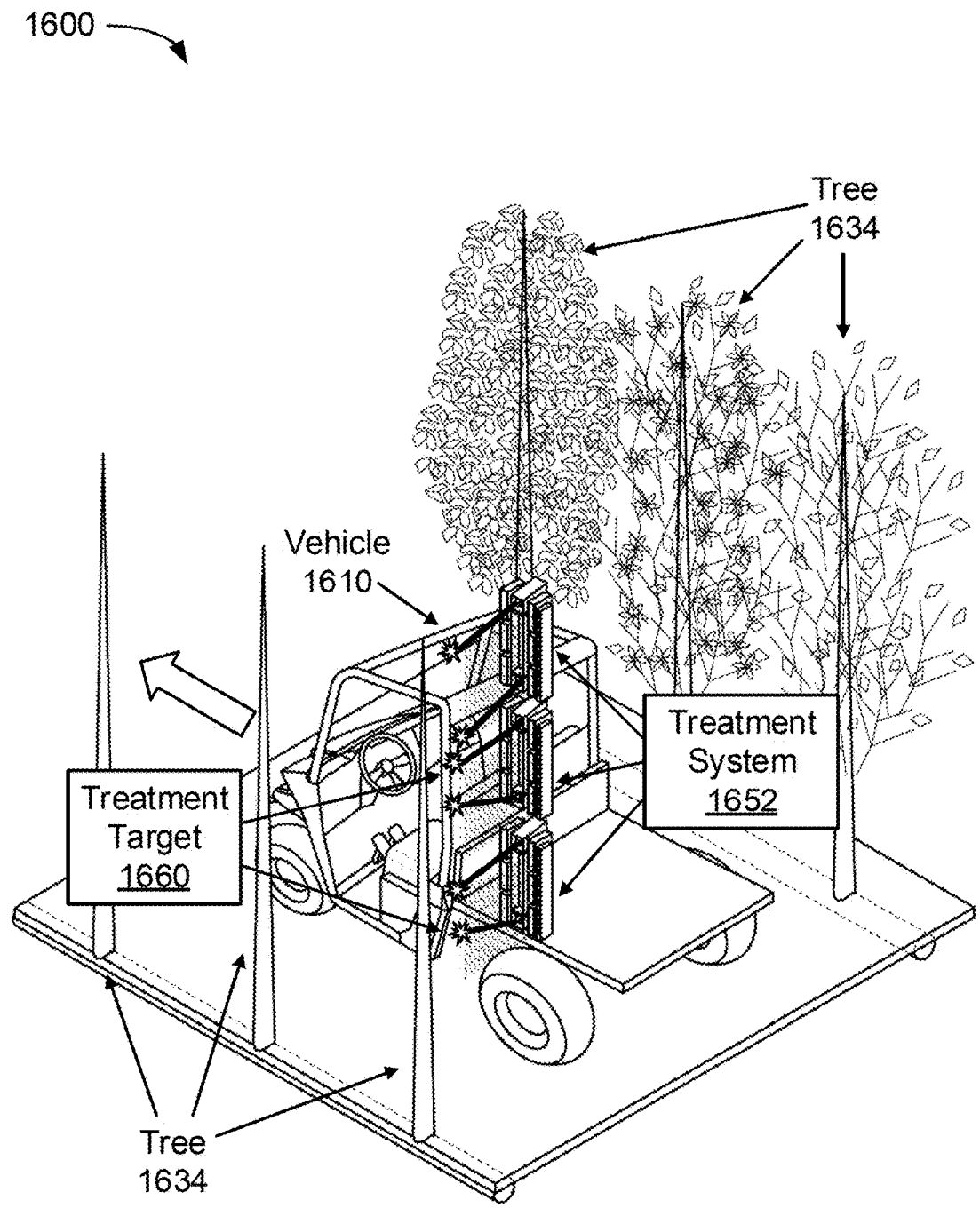
FIG. 16 is a diagram illustrating an example vehicle supporting an example observation and treatment system performing in a geographic boundary, according to some examples.

FIG. 16 is a diagram 1600 illustrating an example vehicle supporting an example observation and treatment system performing in a geographic boundary, according to some examples. In this example, a vehicle 1610 can support one or more treatment system 1652. The treatment system 1652 can be similar to that of system 100, agricultural treatment system 400, system 600, and system 800 described above. The vehicle 1610 can be operating in a geographic boundary such as a farm or orchard. A portion of the geographic boundary illustrated in FIG. 16 with one or more trees 1634. In this example the vehicle 1610 can be operating in an orchard with multiple rows of trees or other plants for the treatment systems 1652 to observe and treat. In one example, the vehicle can be travelling in a straight line along a row of trees and crops on both sides of the vehicle.

One or more treatment systems 1652 can be mounted on top, embedded in, suspended underneath, towed, or oriented in many ways securely onto the vehicle such that the treatment system 1652 can be configured and oriented to scan a row of crops or plants or other agricultural scenes in a line while the vehicle 1610 is moving.

The vehicle 1610 may include functionalities and/or structures of any motorized vehicle, including those powered by electric motors or internal combustion engines. For example, vehicle 1610 may include functionalities and/or structures of a truck, such as a pick-up truck (or any other truck), an all-terrain vehicle ("ATV"), a utility task vehicle ("UTV"), or any multipurpose off-highway vehicle, including any agricultural vehicle, including tractors or the like. The treatment systems 1652 that may be powered or pulled separately by a vehicle, which may navigate path portions manually or autonomously in the geographic boundary.

In one example, a geographic boundary can be configured to have two rows of plants on each side of a single lane for a vehicle to navigate through. On each side of the vehicle will be vertically growing plants such as trees. The treatment system 1652 can be mounted on the vehicle in a way that image sensors of the treatment system 1652 are pointing directly at the trees on each two left and right side of the vehicle. As the vehicle operates along a lane or path in the orchard, the treatment system 1652 can capture a series of images from one side to another of the row of plants as well as treat each agricultural object with a precision treatment.

Figure 17A:
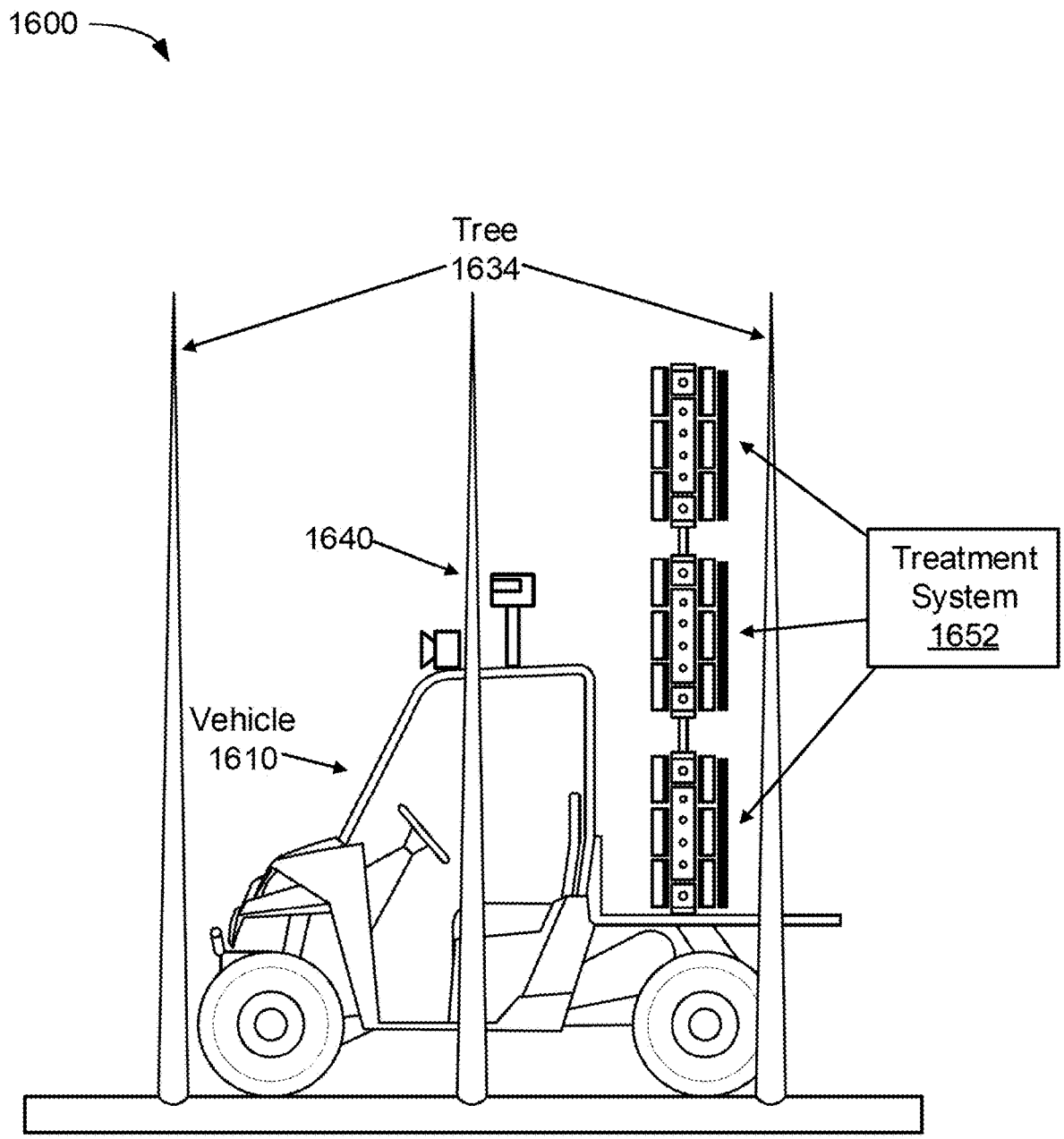
FIG. 17A is a diagram illustrating an example vehicle supporting an example observation and treatment system performing in a geographic boundary, according to some examples.
Figure 17B:
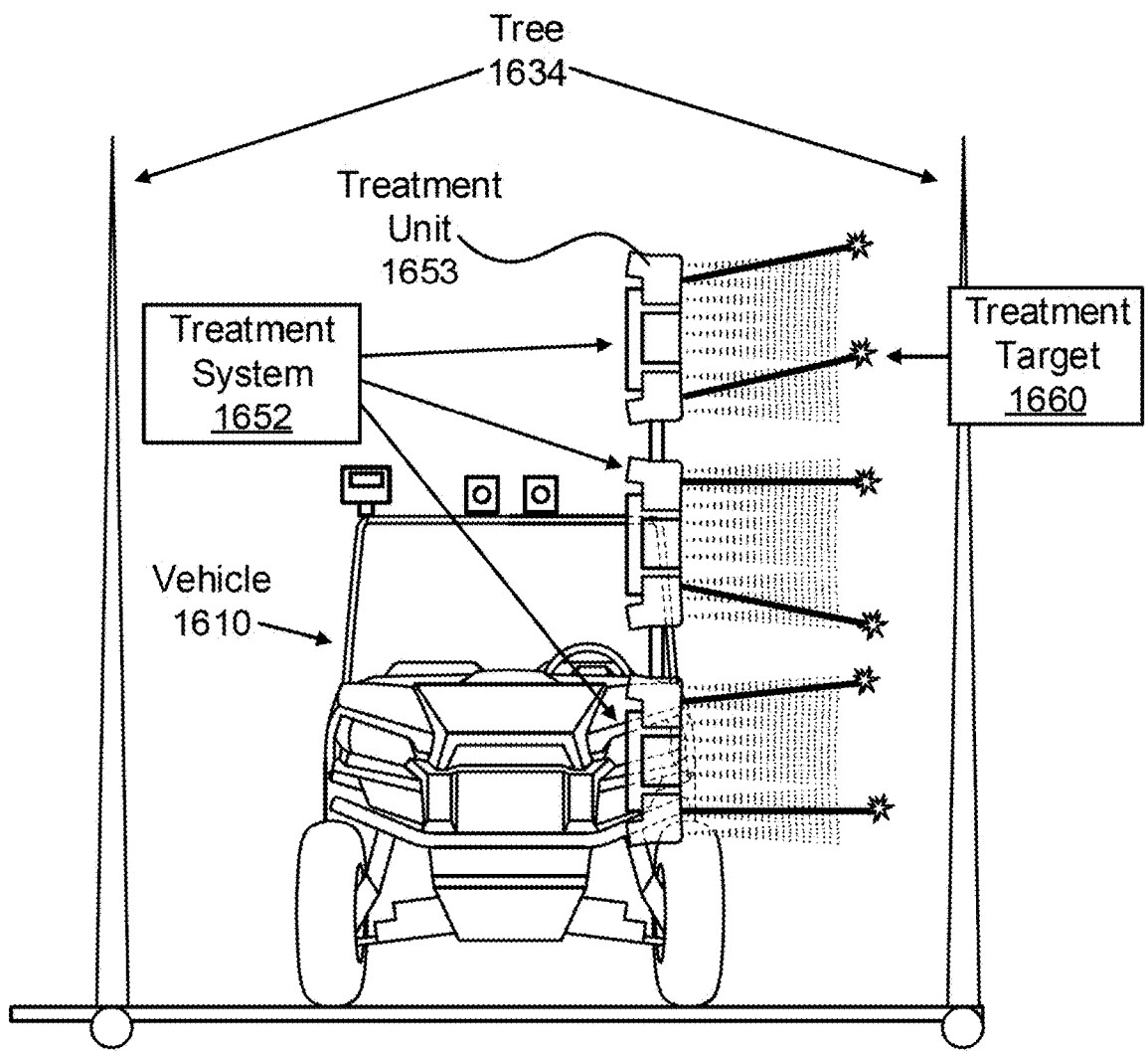
FIG. 17B is a diagram illustrating an example vehicle supporting an example observation and treatment system performing in a geographic boundary, according to some examples.

FIG. 17A and FIG. 17B are side and front views, respectively, of the illustration depicted in FIG. 16. The vehicle can include spatial and navigation sensors, including sensors 1640, for localizing the vehicle and objects, as described above. The sensors 1640 can be visual odometry sensors including various types of cameras, rangefinders, and LiDar, simultaneous localization and mapping sensors including various types of cameras, rangefinders and Lidars, etc. Each treatment system supported by the vehicle 1610 can include treatment units 1653 for emitting a treatment projectile or droplet onto a treatment target 1660 including agricultural objects of interest.

Figure 18:
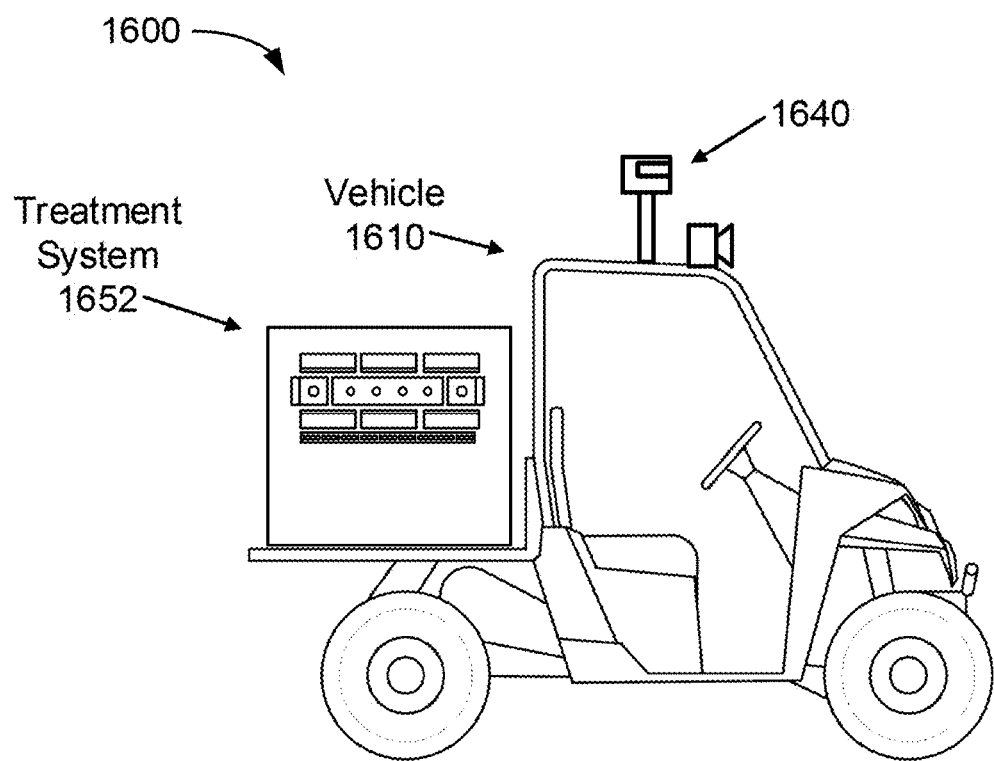
FIG. 18 is a diagram illustrating an example vehicle supporting an example observation and treatment system, according to some examples.

FIG. 18 is a diagram illustrating the vehicle 1610 supporting the treatment system 1652 in an alternative orientation.

Figure 19:
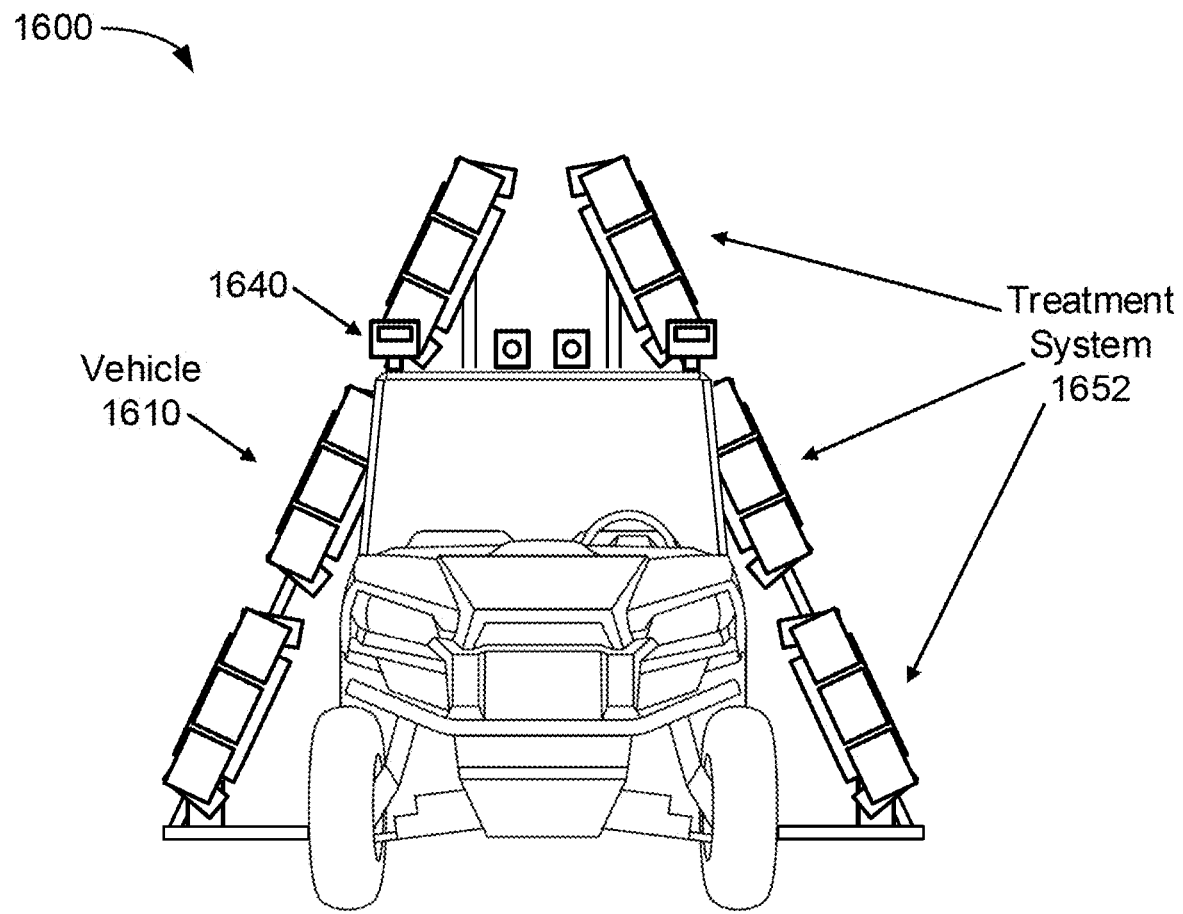
FIG. 19 is a diagram illustrating an example vehicle supporting an example observation and treatment system, according to some examples.
Figure 21:
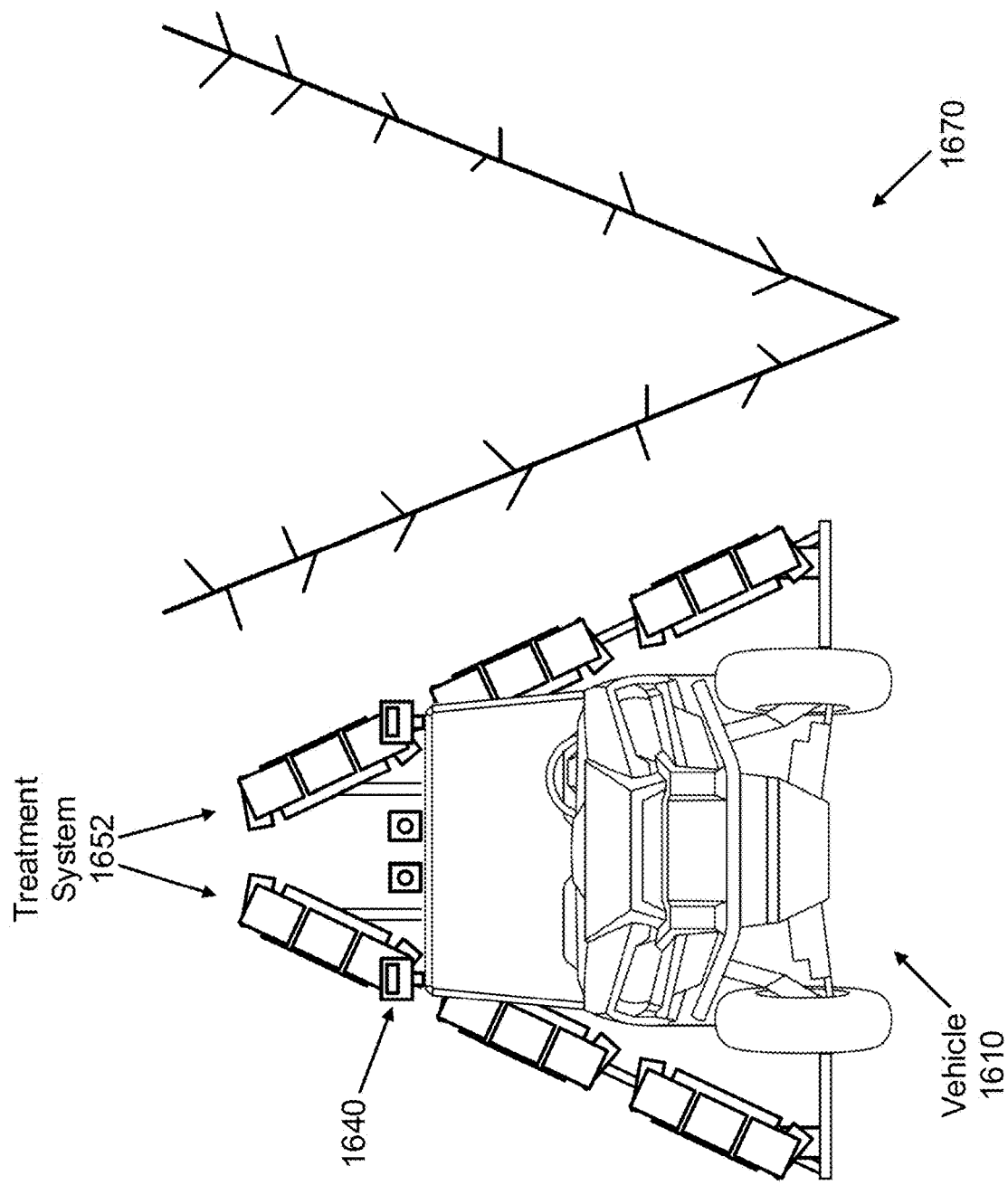
FIG. 21 is a diagram illustrating an example vehicle supporting an example observation and treatment system performing in a geographic boundary, according to some examples.

FIG. 19 illustrates a vehicle supporting or towing one or more treatment systems 1652 configured and optimized for a geographic environment having plants grown on V-shaped trellises or grown in a "V" shape, discussed further in the discussion of FIG. 21.

Figure 20:
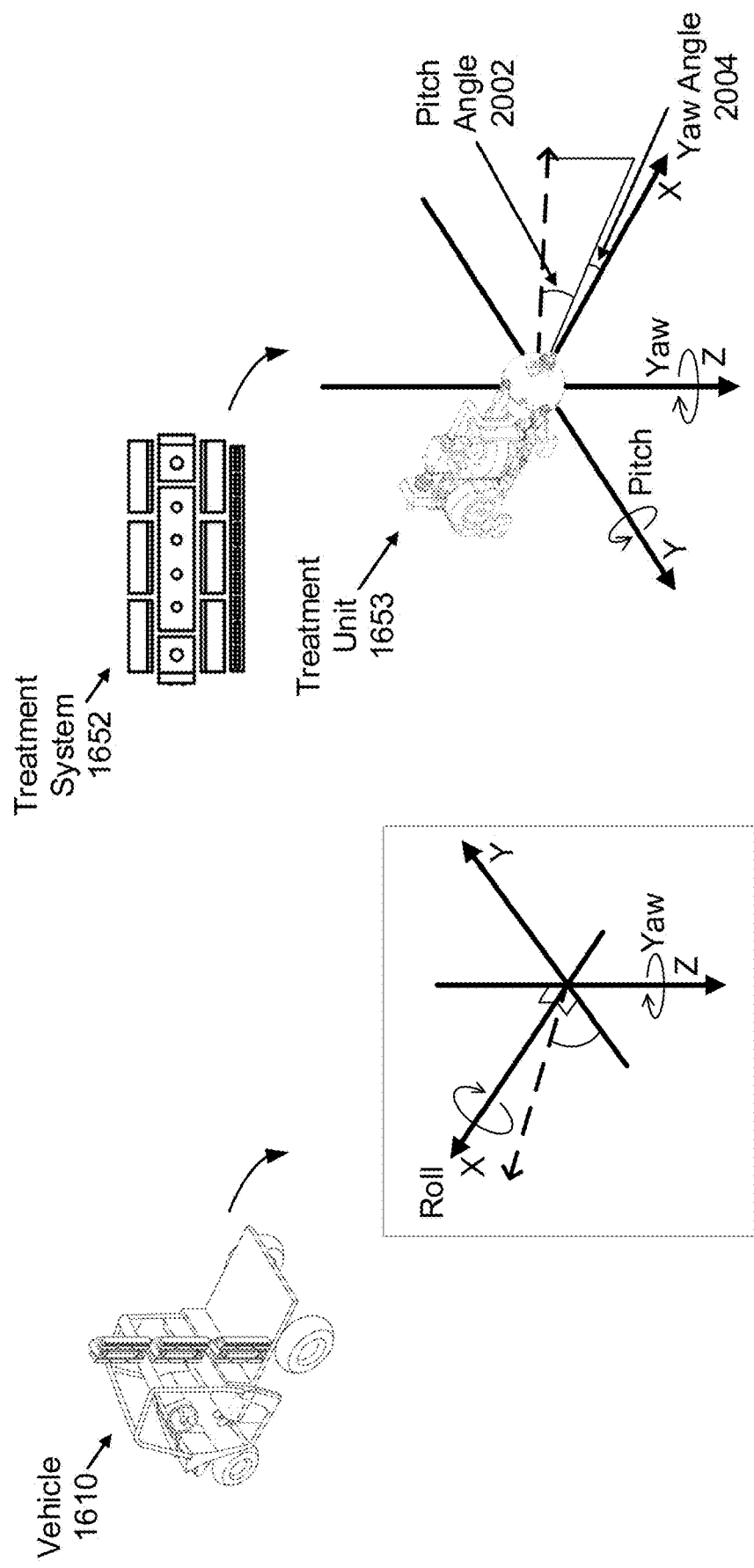
FIG. 20 is a diagram illustrating axes of movement, rotation, and degrees of freedom of a vehicle and components of an observation and treatment system, according to some examples.

FIG. 20 illustrates a vehicle having coordinates associated with rotational movement including that of roll about an X axis, pitch about a Y axis, and yaw about a Z axis, as well as translational coordinates associated with lateral movement including an X, Y, and Z position in a geographic boundary. The vehicle 1610, illustrated in FIG. 20 can move with at least 6 degrees of freedom. Additionally, the treatment unit 163 of the treatment system 1652 can also have coordinates associated with rotational movement including that of roll about an X axis, pitch about a Y axis, and yaw about a Z axis, as well as translational coordinates associated with lateral movement including an X, Y, and Z position in a geographic boundary. This can include rotating and moving a gimbal assembly of the treatment unit 1653 to a desired pitch angle 2002 and desired yaw angle 2004 when the treatment unit is configuring and orienting itself to position a nozzle or head of the treatment unit 1653 at a target or aligning a line of sight towards a target for emitting a projectile.

FIG. 21 illustrates a vehicle supporting or towing one or more treatment systems 1652 configured and optimized for a geographic environment having plants grown on V-shaped trellises. The plant 1670 are either plants grown on a V-shaped trellis or naturally grow into a "V" shape. Additionally, other configurations of the treatment systems 1652 supported by the vehicle 1610 can be used to optimize for image acquisition and treatment. In one example, a tree can be grown vertically with assistance such that each agricultural object detected a roughly the same distance away from the vehicle, as opposed to other trees that have a crown of branches and leaves where some agricultural objects detected are greater in depth from the vehicle as opposed to other agricultural objects.

Figure 22:
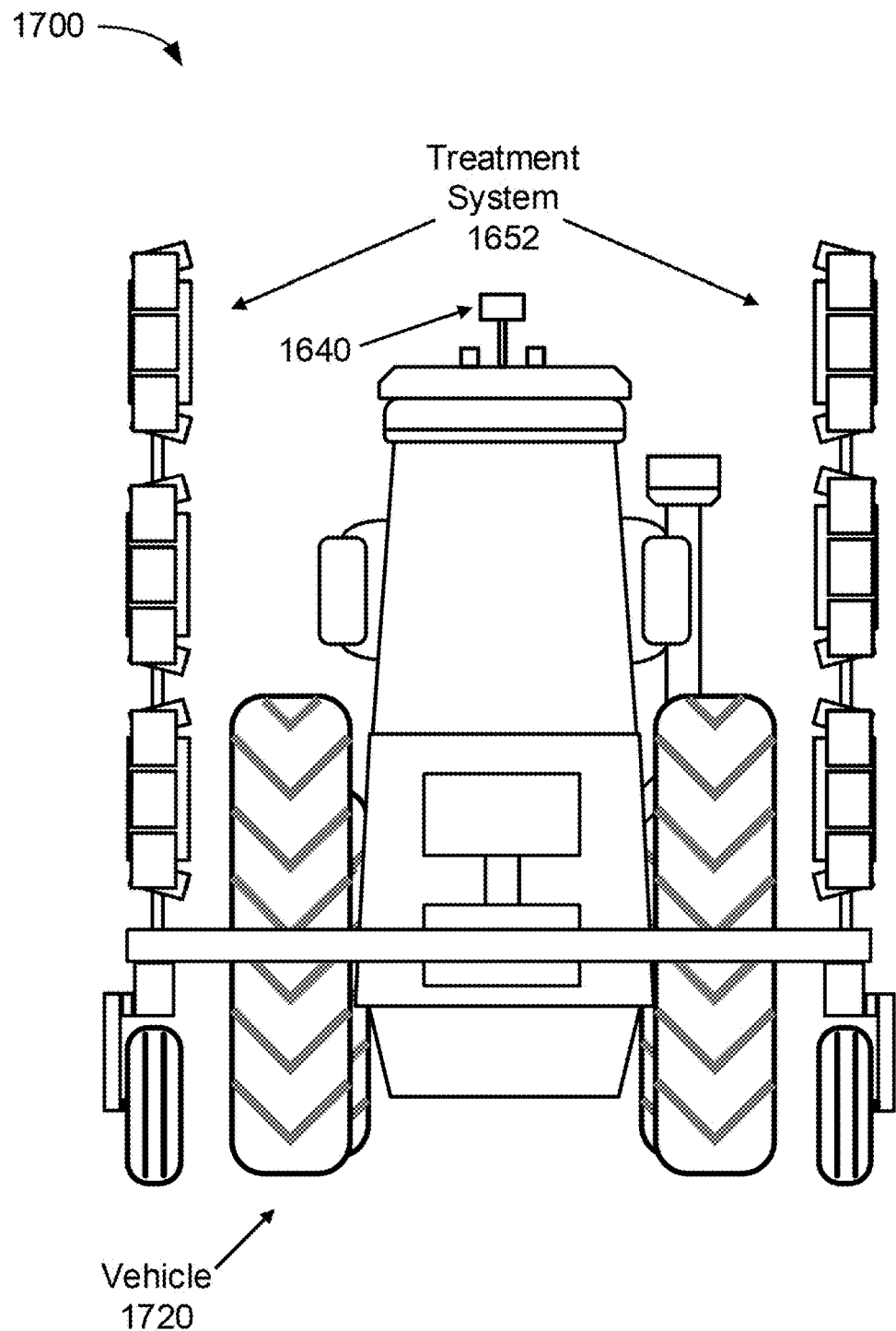
FIG. 22 is a diagram illustrating an example vehicle supporting an example observation and treatment system, according to some examples.

FIG. 22 illustrates a diagram 1700 including a vehicle 1720, having one or more sensors 1640 and other electronic devices, supporting and towing one or more treatments systems 1652. In the example diagram of FIG. 22, the vehicle 1720 can be a tractor towing a plurality of treatment systems 1652.

Figure 23:
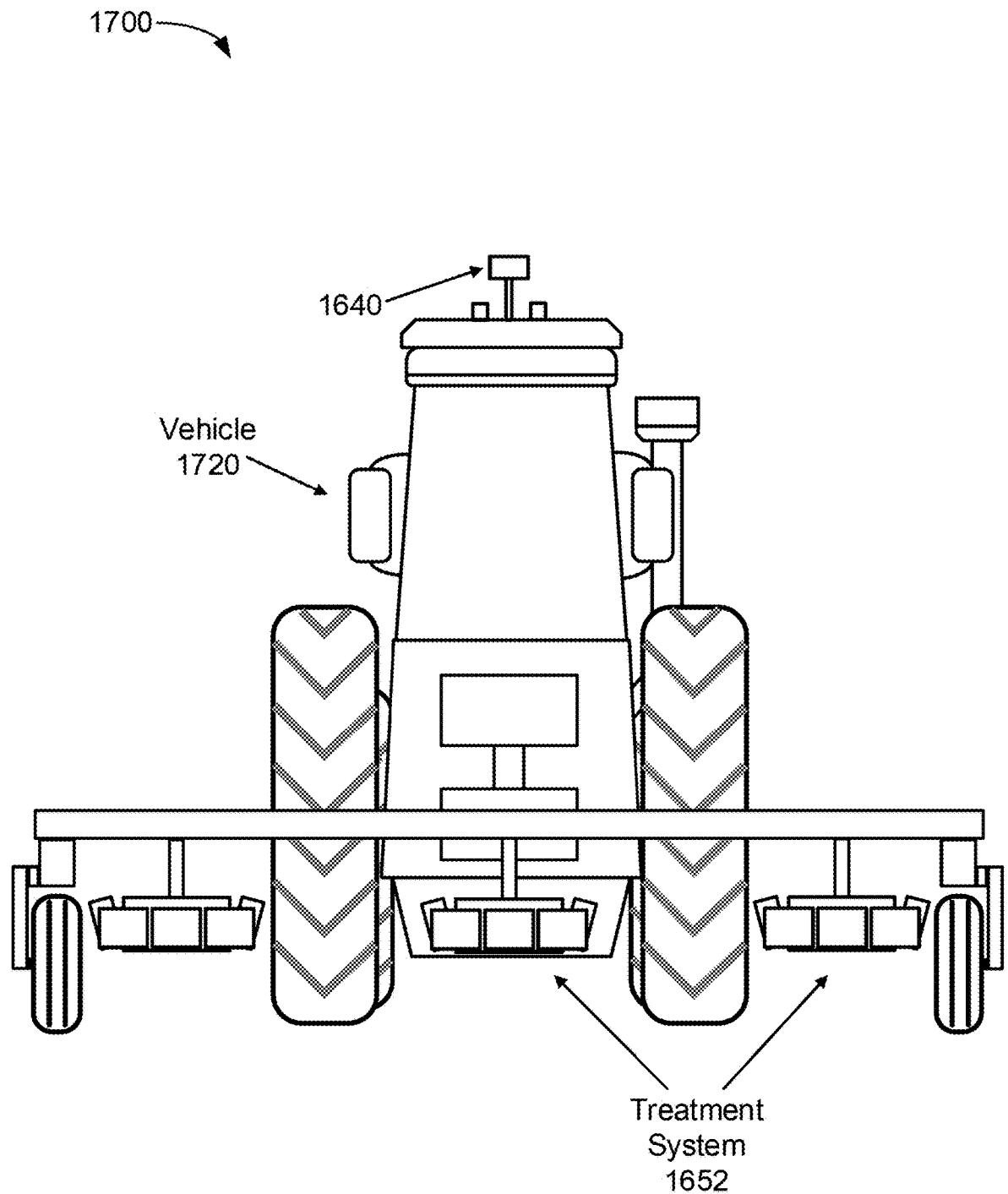
FIG. 23 is a diagram illustrating an example vehicle supporting an example observation and treatment system, according to some examples.

FIG. 23 illustrates the diagram 1700 with an alternate orientation of the treatment systems 1652 being towed by vehicle 1720.

Figure 24:
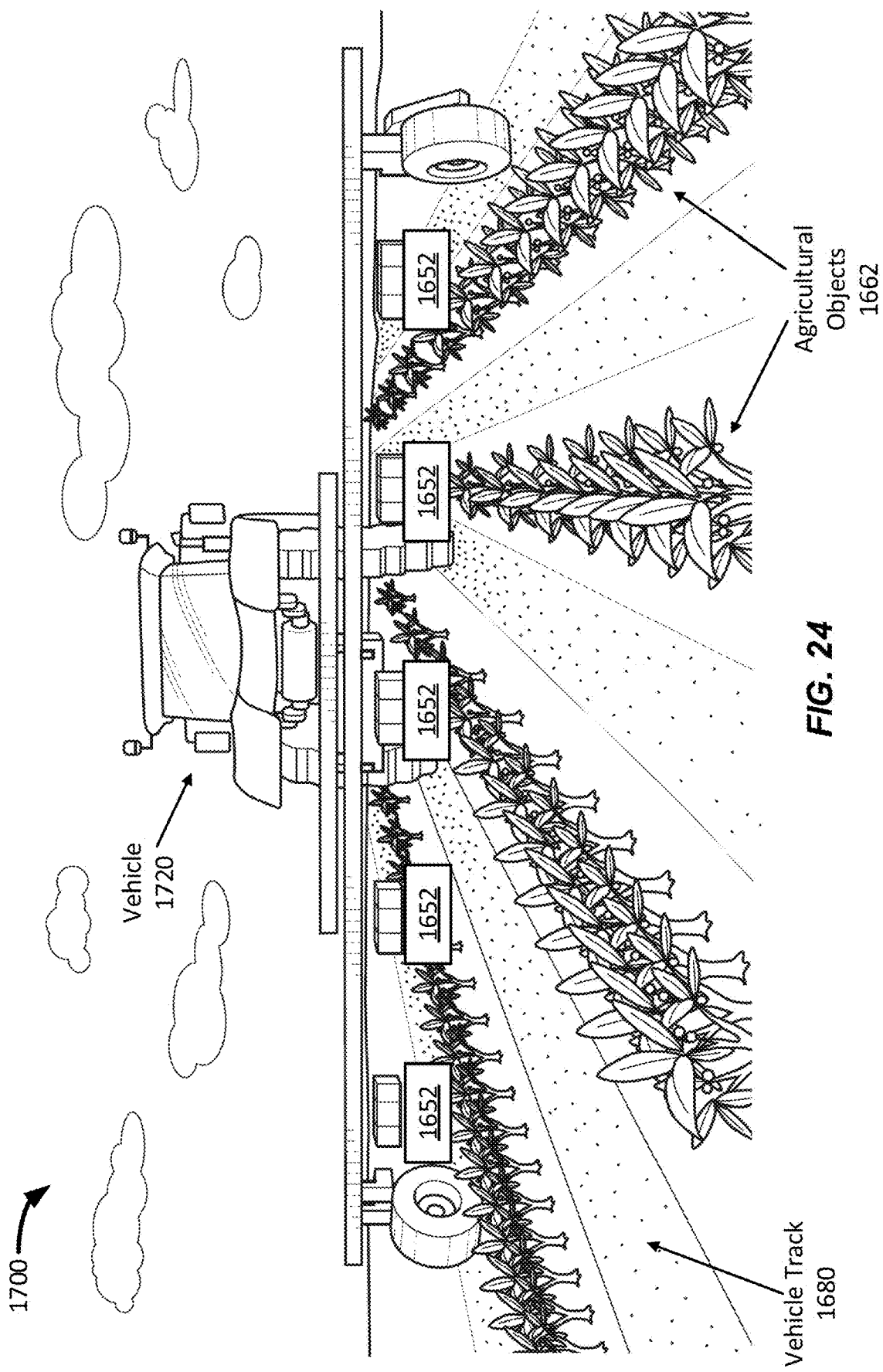
FIG. 24 is a diagram illustrating an example vehicle supporting an example observation and treatment system performing in a geographic boundary, according to some examples.

Further illustrated in FIG. 24, a vehicle 1720, such as a tractor is configured to tow one or more treatment systems 1652 along a vehicle track 1680 having multiple lanes for the vehicle 1720 and tow support, and operating in a geographic boundary. Between each vehicle track 1680 are one or more rows of plants for each treatment system 1652 to scan across each row to observe and treat each individual plant growing form the ground.

The treatment systems 1652 can be configured to observe a plant, soil, agricultural environment, treat a plant, soil, agricultural environment, or a combination thereof, such as treating a plant for growth, fertilizing, pollinating, protecting and treating its health, thinning, harvesting, or treating a plant for the removal of unwanted plants or organisms, or stopping growth on certain identified plants or portions of a plant, or a combination thereof.

In one example, the treatment system 1652 can be configured in geographic boundary to observe and treat soil for soil sampling and mapping of features and chemical compositions of soil. The agricultural objects described above for targeting and treating can be of specific patches of soil that can be identified and features and classification labelled by a vision of the treatment system 1652 or agricultural treatment system 400. Each patch or region of the soil detected by the treatment system 1652 can be indexed and mapped with a timestamp associated with the moment the patch or region was sensed and treatment history detailing each treatment applied to each patch or region of the soil.

The terminology used herein is for the purpose of describing particular aspects only and is not intended to be limiting of the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the disclosure. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk, optical disks, CD-ROMs, and magnetic-optical disks, read-only memories (ROMs), random access memories (RAMs), EPROMs, EEPROMs, magnetic or optical cards, solid state drives, flash drives, SATA drives, NAND and 3D NAND flash drives, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method performed by an agricultural treatment system comprising one or more processors comprising hardware, one or more sensors, and a treatment unit, the one or more processors configured to perform operations comprising:
receiving sensor data of a plurality of pre identified agricultural objects including each of the pre identified agricultural objects' real-world location;
determining a first real-world location of the agricultural treatment system;
receiving captured sensor data depicting agricultural objects;
selecting one or more pre identified agricultural objects, wherein the real-world locations of the selected pre identified agricultural objects are proximate to the first real-world location;
comparing at least a portion of the selected pre identified agricultural objects with the captured sensor data;
identifying a target object from the comparing of at least one selected pre identified agricultural object with at least a portion of the captured sensor data.

2. The method of claim 1, wherein the sensor data of a plurality of pre identified agricultural objects comprise a plurality of images depicting agricultural objects.

3. The method of claim 2, wherein comparing at least a portion of the selected pre identified agricultural objects comprises:
comparing pixels of the images depicting agricultural objects to a portion of the captured sensor data comprising captured images; and
identifying a match where a determined confidence level meets or exceeds a threshold value.

4. The method of claim 1, further comprising associating the one or more captured sensor data with the first real-world geo spatial location of the agricultural treatment system.

5. The method of claim 1, wherein comparing at least a portion of the selected pre identified agricultural objects comprises:
identifying a landmark object in the plurality of pre identified agricultural objects; and
matching a portion of the landmark object in the pre identified agricultural objects to a portion of the captured sensor data.

6. The method of claim 5, wherein the target object is a real-world object intended to be treated with a fluid projectile or light source.

7. The method of claim 1, wherein determining a first real-world location of the agricultural treatment system comprises determine a first pose of the treatment system.

8. The method of claim 7, wherein the first pose is determined by performing SLAM.

9. The method of claim 8, wherein the first pose is determined with one or more stereo cameras.

10. The method of claim 1, wherein the sensor data of a plurality of pre identified agricultural objects comprises portions of labelled 2D images, portions of labelled 3D images, portions of 2D models, portions of 3D models, or a combination thereof depicting views of one or more unique agricultural objects in the real-world.

11. A non-transitory computer storage medium comprising instructions that when executed by one or more processors included of an agricultural treatment system, cause the agricultural treatment system to perform the operations comprising:
receiving sensor data of a plurality of pre identified agricultural objects including each of the pre identified agricultural objects' real-world location;
determining a first real-world location of the agricultural treatment system;

receiving captured sensor data depicting agricultural objects;

selecting one or more pre identified agricultural objects, wherein the real-world locations of the selected pre identified agricultural objects are proximate to the first real-world location;

comparing at least a portion of the selected pre identified agricultural objects with the captured sensor data;

identifying a target object from the comparing of at least one selected pre identified agricultural object with at least a portion of the captured sensor data.

12. The non-transitory computer storage medium of claim 11, wherein the sensor data of a plurality of pre identified agricultural objects comprise a plurality of images depicting agricultural objects.

13. The non-transitory computer storage medium of claim 12, wherein comparing at least a portion of the selected pre identified agricultural objects comprises:

comparing pixels of the images depicting agricultural objects to a portion of the captured sensor data comprising captured images; and identifying a match where a determined confidence level meets or exceeds a threshold value.

14. The non-transitory computer storage medium of claim 11, further comprising associating the one or more captured sensor data with the first real-world geo spatial location of the agricultural treatment system.

15. The non-transitory computer storage medium of claim 11, wherein comparing at least a portion of the selected pre identified agricultural objects comprises:

identifying a landmark object in the plurality of pre identified agricultural objects; and matching a portion of the landmark object in the pre identified agricultural objects to a portion of the captured sensor data.

16. The non-transitory computer storage medium of claim 15, wherein the target object is a real-world object intended to be treated with a fluid projectile or light source.

17. The non-transitory computer storage medium of claim 11, wherein determining a first real-world location of the agricultural treatment system comprises determine a first pose of the treatment system.

18. The non-transitory computer storage medium of claim 17, wherein the first pose is determined by performing SLAM.

19. The non-transitory computer storage medium of claim 11, wherein the sensor data of a plurality of pre identified agricultural objects comprises portions of labelled 2D images, portions of labelled 3D images, portions of 2D models, portions of 3D models, or a combination thereof depicting views of one or more unique agricultural objects in the real-world.

20. A method performed by an agricultural treatment system comprising one or more processors comprising hardware, one or more sensors, and a treatment unit, the one or more processors configured to perform operations comprising:

receiving sensor data of a plurality of pre identified agricultural objects including each of the pre identified agricultural objects' real-world location;

determining a first real-world location of the agricultural treatment system;

receiving captured sensor data depicting agricultural objects;

selecting one or more pre identified agricultural objects, wherein the real-world locations of the selected pre identified agricultural objects are proximate to the first real-world location;

comparing at least a portion of the selected pre identified agricultural objects with the captured sensor data;

identifying a target object from the comparing of at least one selected pre identified agricultural object with at least a portion of the captured sensor data;

activating the treatment unit comprising emitting a chemical fluid projectile or shining a light source at the target object.

* * * * *